US012574911B2

(12) United States Patent
Abotabl et al.

(10) Patent No.: US 12,574,911 B2
(45) Date of Patent: Mar. 10, 2026

(54) WIRELESS COMMUNICATION USING MULTIPLE ACTIVE BANDWIDTH PARTS

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Alexandros Manolakos, Escondido, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 18/007,717

(22) PCT Filed: Jul. 13, 2021

(86) PCT No.: PCT/US2021/041480
§ 371 (c)(1),
(2) Date: Dec. 1, 2022

(87) PCT Pub. No.: WO2022/015760
PCT Pub. Date: Jan. 20, 2022

(65) Prior Publication Data
US 2023/0239847 A1 Jul. 27, 2023

(30) Foreign Application Priority Data
Jul. 16, 2020 (GR) ............................... 20200100419

(51) Int. Cl.
*H04W 72/0453* (2023.01)
*H04W 72/232* (2023.01)

(52) U.S. Cl.
CPC ..... *H04W 72/0453* (2013.01); *H04W 72/232* (2023.01)

(58) Field of Classification Search
CPC .............. H04L 5/0023; H04L 5/0092; H04W 72/0453; H04W 72/232
See application file for complete search history.

(56) References Cited

U.S. PATENT DOCUMENTS

| | | | | |
|---|---|---|---|---|
| 11,032,836 B2* | 6/2021 | Zhao | ........................ | H04W 4/40 |
| 11,330,506 B2* | 5/2022 | Ugurlu | .............. | H04W 72/0453 |

(Continued)

FOREIGN PATENT DOCUMENTS

| | | | | | |
|---|---|---|---|---|---|
| CN | 115735347 A | * | 3/2023 | ........... | H04L 1/0003 |
| CN | 115735347 B | * | 4/2025 | ............ | H04W 72/53 |

(Continued)

OTHER PUBLICATIONS

International Search Report and Written Opinion—PCT/US2021/041480—ISA/EPO—Jan. 28, 2022.

(Continued)

*Primary Examiner* — Eric Nowlin
(74) *Attorney, Agent, or Firm* — Loza & Loza, LLP

(57) ABSTRACT

Aspects relate to wireless communication using multiple active bandwidth parts (BWPs). For example, a base station may configure a user equipment with two or more active BWPs. The user equipment may then use one or more of the active BWPS at a time. For example, the user equipment may use multiple active BWPs for full-duplex communication. Alternatively or in addition, the user equipment may switch between active BWPs taking advantage of the extremely low switching time (e.g., at or near zero seconds) between active BWPs.

31 Claims, 17 Drawing Sheets

(56) References Cited

U.S. PATENT DOCUMENTS

| | | | | |
|---|---|---|---|---|
| 11,516,800 | B2 * | 11/2022 | Ang | H04L 5/001 |
| 11,533,720 | B2 * | 12/2022 | Huang | H04W 72/0446 |
| 11,736,213 | B2 * | 8/2023 | Su | H04L 5/0094 |
| | | | | 370/252 |
| 11,937,235 | B2 * | 3/2024 | Lei | H04W 80/02 |
| 2007/0124425 | A1 | 5/2007 | Gross | |
| 2019/0075585 | A1 * | 3/2019 | Deogun | H04B 7/02 |
| 2019/0132110 | A1 * | 5/2019 | Zhou | H04W 72/0453 |
| 2019/0166066 | A1 | 5/2019 | Ang et al. | |
| 2019/0349180 | A1 * | 11/2019 | Lu | H04L 27/2607 |
| 2019/0349983 | A1 * | 11/2019 | Loehr | H04W 72/23 |
| 2019/0357291 | A1 * | 11/2019 | Zhou | H04W 76/19 |
| 2019/0394710 | A1 * | 12/2019 | Ugurlu | H04L 5/0098 |
| 2020/0280474 | A1 * | 9/2020 | Babaei | H04L 27/26025 |
| 2020/0374844 | A1 * | 11/2020 | Takeda | H04L 27/2602 |
| 2021/0051688 | A1 * | 2/2021 | Zhao | H04W 4/40 |
| 2021/0314946 | A1 * | 10/2021 | Ang | H04L 5/001 |
| 2021/0314955 | A1 * | 10/2021 | Zhang | H04W 72/53 |
| 2021/0337539 | A1 * | 10/2021 | Lei | H04W 72/23 |
| 2022/0007365 | A1 * | 1/2022 | Jung | H04W 24/10 |
| 2022/0007395 | A1 * | 1/2022 | Lei | H04L 1/0003 |
| 2022/0182160 | A1 * | 6/2022 | Su | H04B 17/309 |
| 2022/0200777 | A1 * | 6/2022 | Lee | H04L 5/1461 |
| 2022/0338230 | A1 * | 10/2022 | Yu | H04L 5/0053 |
| 2022/0369421 | A1 * | 11/2022 | Zhou | H04W 72/0453 |
| 2022/0407668 | A1 * | 12/2022 | Zhang | H04W 72/23 |

FOREIGN PATENT DOCUMENTS

| | | | | | |
|---|---|---|---|---|---|
| EP | 2595425 | A1 * | 5/2013 | | H04W 28/20 |
| EP | 3662715 | A1 | 6/2020 | | |
| WO | 2018203717 | A1 | 11/2018 | | |
| WO | WO-2019225970 | A1 | 11/2019 | | |
| WO | WO-2020030064 | A1 | 2/2020 | | |
| WO | WO-2020091270 | A1 | 5/2020 | | |
| WO | WO-2021216715 | A1 * | 10/2021 | | H04W 72/23 |
| WO | WO-2022006342 | A1 * | 1/2022 | | H04W 72/53 |
| WO | WO-2022015848 | A1 * | 1/2022 | | H04L 5/0005 |

OTHER PUBLICATIONS

Partial International Search Report—PCT/US2021/041480—ISA/ EPO—Oct. 29, 2021.

* cited by examiner

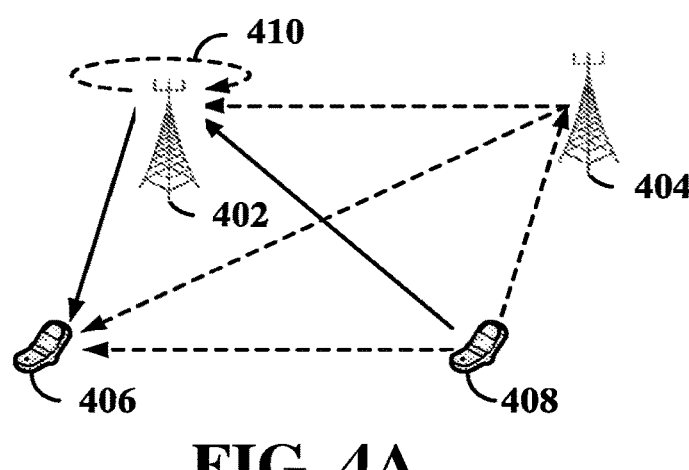
FIG. 4A
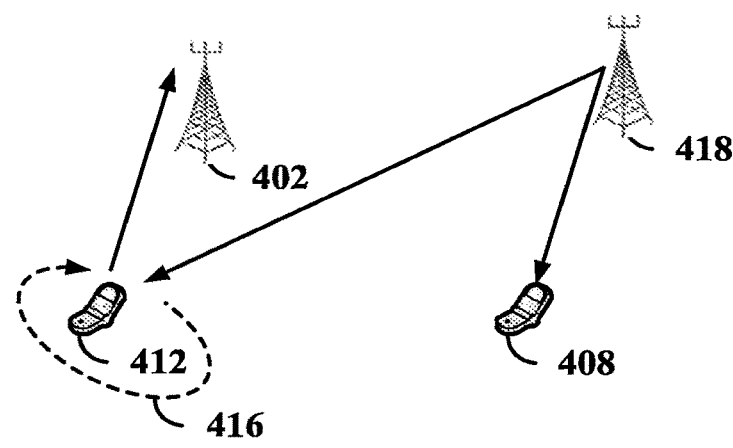
FIG. 4B
FIG. 4C

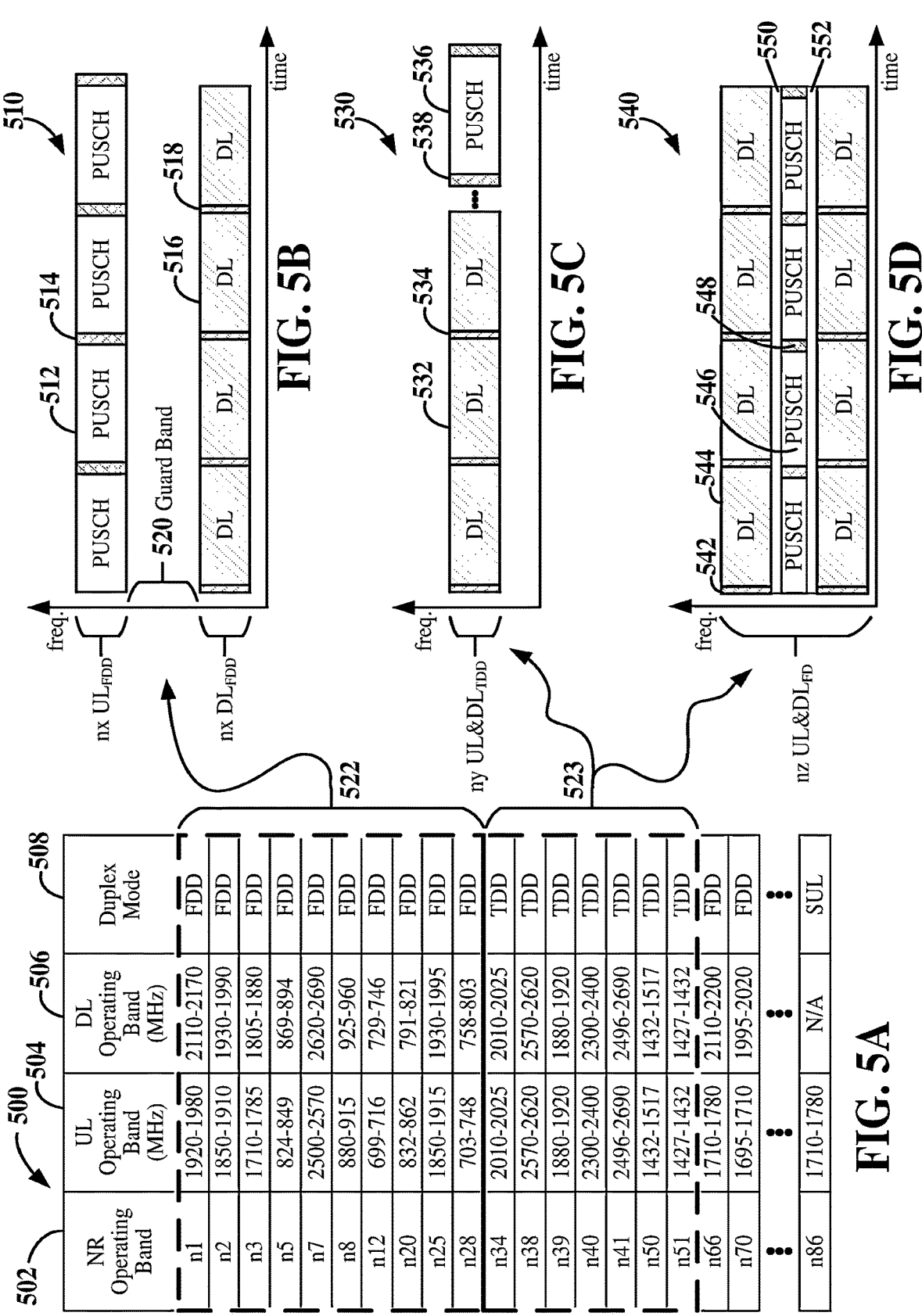

1400

Start

Receive bandwidth part (BWP) configuration information from a base station, the BWP configuration information specifying a first active BWP for the UE and a second active BWP for the UE ~1402

Select the first active BWP ~1404

Communicate with the base station using the first active BWP ~1406

End

1500

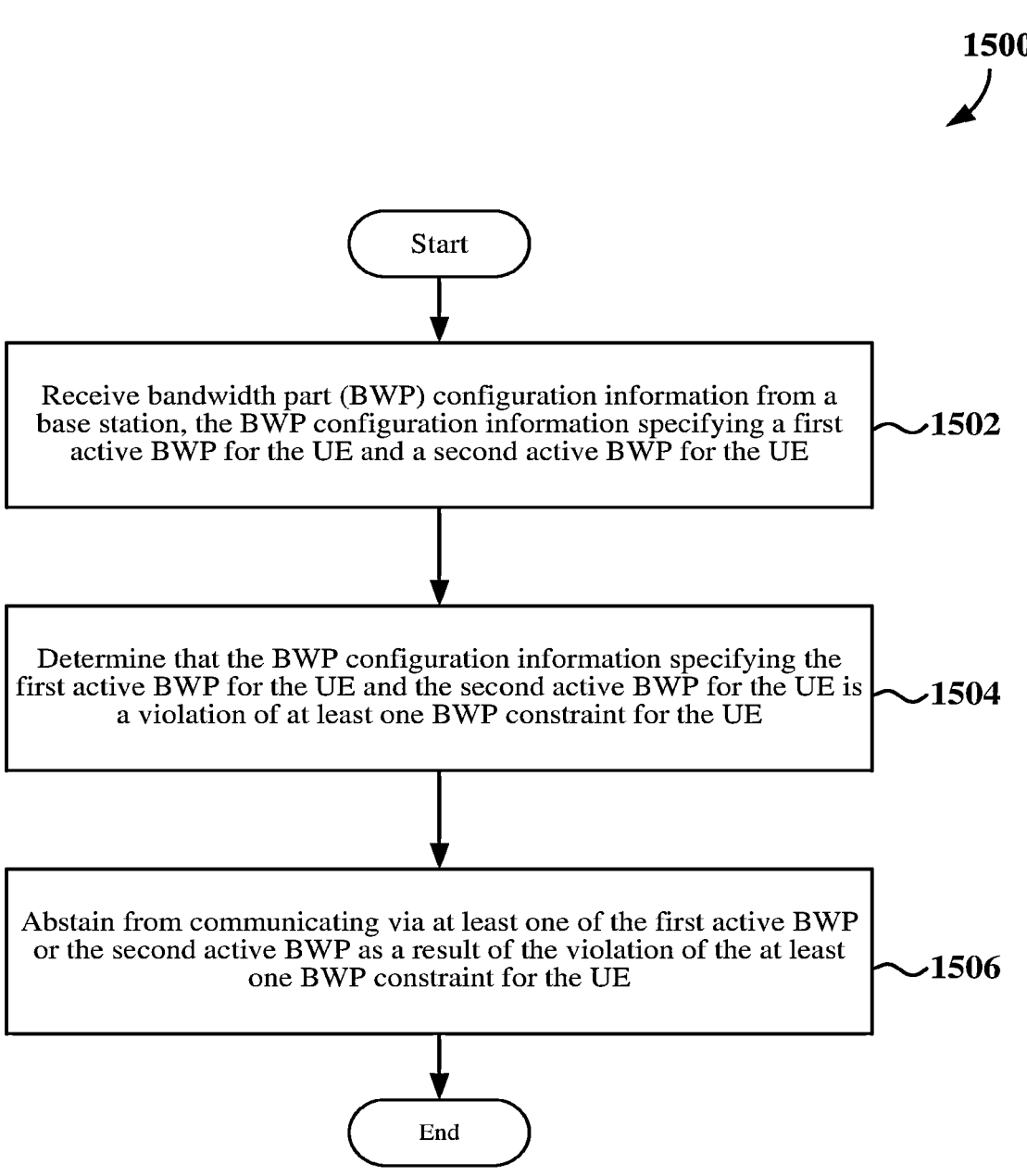

Start

Receive bandwidth part (BWP) configuration information from a base station, the BWP configuration information specifying a first active BWP for the UE and a second active BWP for the UE ~1502

Determine that the BWP configuration information specifying the first active BWP for the UE and the second active BWP for the UE is a violation of at least one BWP constraint for the UE ~1504

Abstain from communicating via at least one of the first active BWP or the second active BWP as a result of the violation of the at least one BWP constraint for the UE ~1506

End

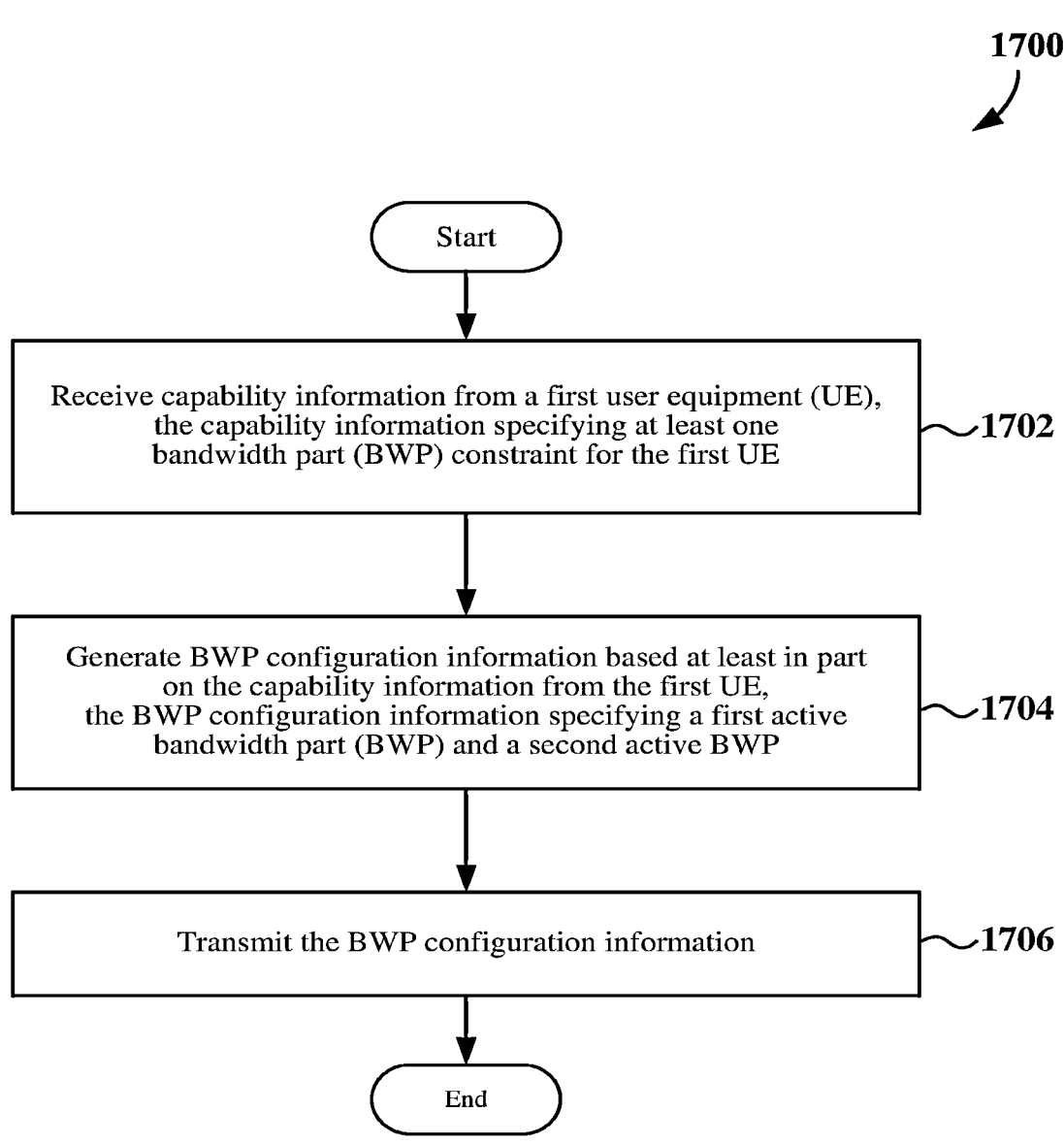

Start

Receive capability information from a first user equipment (UE), the capability information specifying at least one bandwidth part (BWP) constraint for the first UE ~1702

Generate BWP configuration information based at least in part on the capability information from the first UE, the BWP configuration information specifying a first active bandwidth part (BWP) and a second active BWP ~1704

Transmit the BWP configuration information ~1706

End

FIG. 17

WIRELESS COMMUNICATION USING MULTIPLE ACTIVE BANDWIDTH PARTS

CROSS-REFERENCE TO RELATED APPLICATIONS

This application for patent is a U.S. National Stage entry of International Patent Application No. PCT/US2021/041480 filed 13 Jul. 2021, which claims priority to and the benefit of Greece Patent Application Serial No. 20200100419, titled "WIRELESS COMMUNICATION USING MULTIPLE ACTIVE BANDWIDTH PARTS" filed Jul. 16, 2020, and assigned to the assignee hereof and hereby expressly incorporated by reference herein as if fully set forth below in its entirety and for all applicable purposes.

TECHNICAL FIELD

The technology discussed below relates generally to wireless communication networks and, more particularly, to wireless communication using multiple active bandwidth parts.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array module for directional signal transmission and/or reception. Each antenna in the antenna array module transmits a signal that is combined with other signals of other antennas of the same array in such a way that signals at particular angles experience constructive interference while others experience destructive interference.

The base station and the UE can select one or more beam pair links (BPLs) for communication between the base station and the UE on a downlink and/or an uplink. Each beam pair link (BPL) includes corresponding transmit and receive beams on the base station and the UE. For example, on the downlink, a BPL includes a transmit beam on the base station and a receive beam on the UE. To increase the data rate, multiple BPLs can be used to facilitate spatial multiplexing of multiple data streams from the base station to the UE.

To reduce latency and enhance the spectrum efficiency in a cell, full duplex (FD) communications may be used in 5G systems. FD allows simultaneous two-way communication by using spatial multiplexing. In the case of FD using spatial multiplexing, different panels (which may be referred to simply as panels) and beams are operable at the same time but still can achieve FD simultaneous communications through spatial separation (e.g., such as through beam direction). The downlink and uplink frequency bands in FD communications may be fully overlapped, partially overlapped or separated with a guard band in between.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving bandwidth part (BWP) configuration information from a base station via the transceiver. The BWP configuration information may specify a first active BWP for the user equipment and a second active BWP for the user equipment. The method may also include selecting the first active BWP and communicating with the base station using the first active BWP.

In some examples, a user equipment may include a transceiver, a memory, and a processor coupled to the transceiver and the memory. The processor and the memory may be configured to receive bandwidth part (BWP) configuration information from a base station. The BWP configuration information may specify a first active BWP for the user equipment and a second active BWP for the user equipment. The processor and the memory may also be configured to select the first active BWP and communicate with the base station via the transceiver using the first active BWP.

In some examples, a user equipment may include means for receiving bandwidth part (BWP) configuration information from a base station. The BWP configuration information may specify a first active BWP for the user equipment and a second active BWP for the user equipment. The user equipment may also include means for selecting the first active BWP and means for communicating with the base station using the first active BWP.

In some examples, an article of manufacture for use by a user equipment includes a non-transitory computer-readable medium having stored therein instructions executable by one or more processors of the user equipment to receive bandwidth part (BWP) configuration information from a base station. The BWP configuration information may specify a first active BWP for the user equipment and a second active BWP for the user equipment. The computer-readable medium may also have stored therein instructions executable by one or more processors of the user equipment to select the first active BWP and communicate with the base station using the first active BWP.

Selecting the first active BWP may include comparing a first identifier of the first active BWP to a second identifier of the second active BWP, determining that the first identifier has a lower value than the second identifier, and selecting the first active BWP for the communicating with the base station after determining that the first identifier has a lower value than the second identifier. Selecting the first active BWP may include determining that the first active BWP is designated as a main active BWP. Configuration information may be received specifying that the first active BWP is designated as the main active BWP and the second active BWP is designated as the secondary active BWP, specifying that the user equipment is to monitor physical channels and physical signals in both the first active BWP and the second active BWP, specifying that the user equipment is to monitor a physical downlink control channel (PDCCH) in the first active BWP and communicate physical downlink shared channel (PDSCH) information in both the first active BWP and the second active BWP, specifying that the user equipment is to monitor physical channels and physical signals in the first active BWP until the user equipment is signaled to monitor a different active BWP, specifying that the user equipment is to monitor physical channels and physical signals in the first active BWP until the user equipment elects to monitor a different active BWP, or specifying any combination thereof.

In some examples, a method for wireless communication at a user equipment is disclosed. The method may include receiving bandwidth part (BWP) configuration information from a base station. The BWP configuration information may specify a first active BWP for the user equipment and a second active BWP for the user equipment. The method may also include determining that the BWP configuration information specifying the first active BWP for the user equipment and the second active BWP for the user equipment is a violation of at least one BWP constraint for the user equipment. The method may further include abstaining from communicating via at least one of the first active BWP or the second active BWP as a result of the violation of the at least one BWP constraint for the user equipment.

In some examples, a user equipment may include a transceiver, a memory, and a processor coupled to the transceiver and the memory. The processor and the memory may be configured to receive bandwidth part (BWP) configuration information from a base station via the transceiver. The BWP configuration information may specify a first active BWP for the user equipment and a second active BWP for the user equipment. The processor and the memory may also be configured to determine that the BWP configuration information specifying the first active BWP for the user equipment and the second active BWP for the user equipment is a violation of at least one BWP constraint for the user equipment. The processor and the memory may further be configured to abstain from communicating via at least one of the first active BWP or the second active BWP as a result of the violation of the at least one BWP constraint for the user equipment.

In some examples, a user equipment may include means for receiving bandwidth part (BWP) configuration information from a base station. The BWP configuration information may specify a first active BWP for the user equipment and a second active BWP for the user equipment. The user equipment may also include means for determining that the BWP configuration information specifying the first active BWP for the user equipment and the second active BWP for the user equipment is a violation of at least one BWP constraint for the user equipment. The user equipment may further include means for abstaining from communicating via at least one of the first active BWP or the second active BWP as a result of the violation of the at least one BWP constraint for the user equipment.

In some examples, an article of manufacture for use by a user equipment includes a non-transitory computer-readable medium having stored therein instructions executable by one or more processors of the user equipment to receive bandwidth part (BWP) configuration information from a base station. The BWP configuration information may specify a first active BWP for the user equipment and a second active BWP for the user equipment. The computer-readable medium may also have stored therein instructions executable by one or more processors of the user equipment to determine that the BWP configuration information specifying the first active BWP for the user equipment and the second active BWP for the user equipment is a violation of at least one BWP constraint for the user equipment. The computer-readable medium may further have stored therein instructions executable by one or more processors of the user equipment to abstain from communicating via at least one of the first active BWP or the second active BWP as a result of the violation of the at least one BWP constraint for the user equipment.

Determining that the BWP configuration information specifying the first active BWP for the user equipment and the second active BWP for the user equipment is a violation of at least one BWP constraint for the user equipment may be based on a BWP bandwidth constraint for the user equipment, a BWP frequency allocation constraint for the user equipment, at least one channel configuration for a BWP for the user equipment, or any combination thereof. The BWP bandwidth constraint may specify that a sum of a first bandwidth of the first active BWP and a second bandwidth of the second active BWP is to be less than a threshold bandwidth. The BWP frequency allocation constraint may specify a minimum guard band between the first active BWP and the second active BWP. The at least one channel configuration for a BWP may specify that a first physical downlink control channel (PDCCH) configuration of the second active BWP is a function of a second PDCCH configuration of the first active BWP.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 4A is a schematic illustration of a wireless communication network and sources of interference for a transmission from a full-duplex (FD) gNB to a half-duplex (HD) UE according to some aspects.

FIG. 4B is a schematic illustration of a wireless communication network and sources of interference for a transmission from an FD gNB to an FD user equipment (UE) according to some aspects.

FIG. 4C is a schematic illustration of a wireless communication network and sources of interference for a transmission from an FD UE to an FD gNB according to some aspects.

FIG. 5A is a tabular depiction of a plurality of new radio (NR) operating bands (e.g., radio channels), uplink operating band frequencies, downlink operating band frequencies, and the duplex mode associated with each of the NR operating bands according to some aspects.

FIG. 5B is a diagram illustrating a frequency division duplex (FDD) FD modulation scheme according to some aspects.

FIG. 5C is a diagram illustrating a time division duplex (TDD) HD modulation scheme according to some aspects.

FIG. 5D is a diagram illustrating a TDD FD modulation scheme according to some aspects.

FIG. 15 is a flow chart of another example method involving multiple active BWPs according to some aspects.

FIG. 17 is a flow chart of an example method for configuring multiple active BWPs according to some aspects.

DETAILED DESCRIPTION

Figure 1:
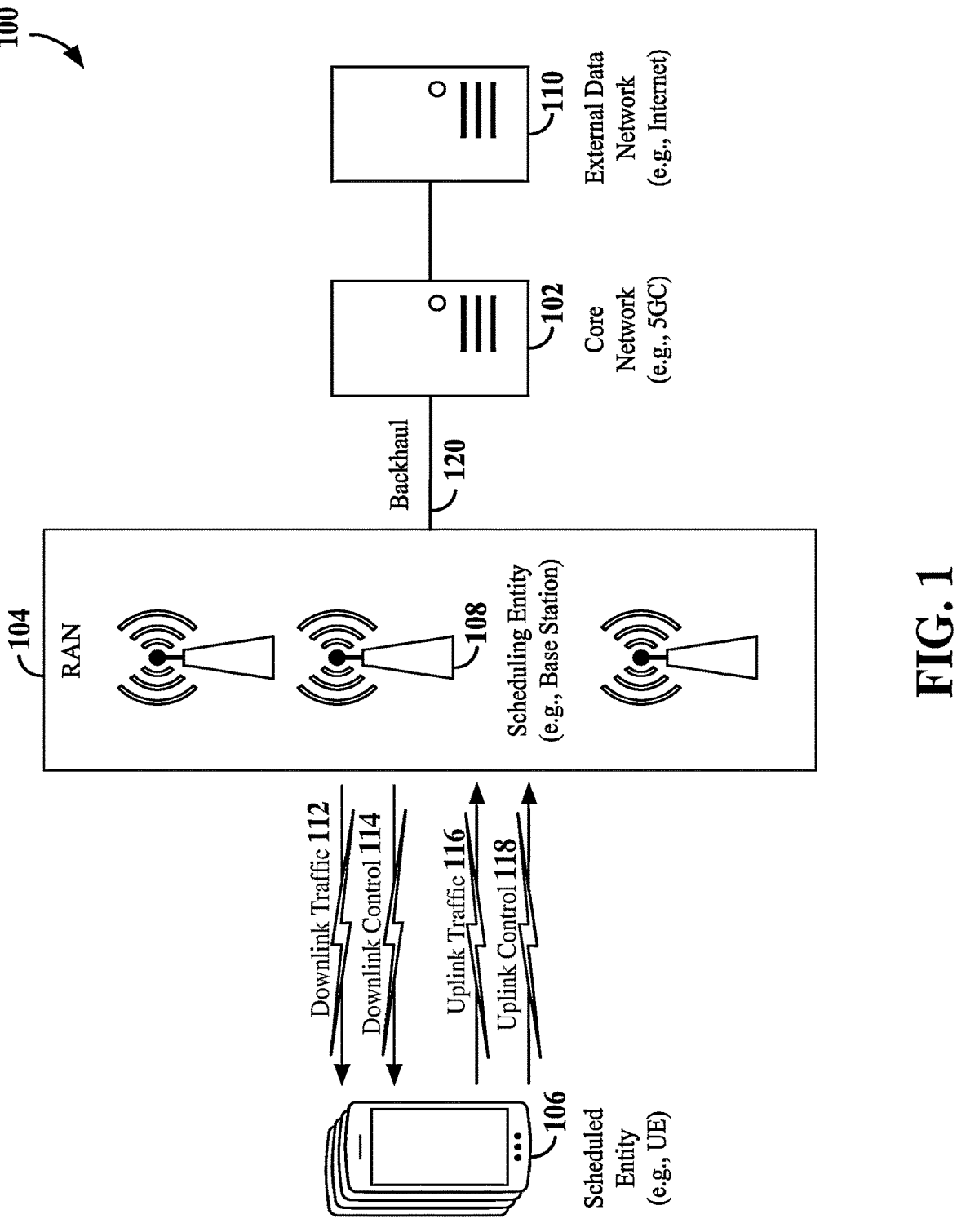
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The disclosure relates in some aspects to wireless communication using multiple active bandwidth parts (BWPs). For example, a base station may configure a user equipment (UE) with two or more active BWPs. The UE may then use multiple active BWPs for full-duplex (FD) communication and/or to improve the switching time from one active BWP to another in general.

Configuring a UE with multiple active BWPs may be subject to one or more constraints (e.g., based on UE capabilities). For example, a UE constraint may specify that the active BWPs have certain bandwidth characteristics (e.g., the combined bandwidths of the active BWPs should not exceed a threshold bandwidth, etc.). As another example, a UE constraint may specify that the active BWPs have certain frequency allocation characteristics (e.g., a minimum guard band, etc.). As a further example, a UE constraint may specify that a physical downlink control channel (PDCCH) configuration of one active BWP is a function of a PDCCH configuration of another active BWP.

A UE may elect to drop one or more active BWPs specified by a BWP configuration. In some examples, a UE may use just one of the active BWPs (e.g., dropping the other active BWP(s)) if the BWP configuration violates a constraint. In some examples, a UE may deem the BWP configuration as an error case (e.g., drop all of the active BWPs) if the BWP configuration violates a constraint.

One active BWP may be deemed a main active BWP and another active BWP deemed a secondary active BWP. In some examples, a UE may select the main active BWP for certain communication operations (e.g., monitoring a PDCCH).

A base station may configure a UE to monitor certain channels and/or signals on certain active BWPs. For example, a base station may configure a UE to monitor a PDCCH, all physical signals, and all physical channels in all (e.g., both) active BWPs. As another example, a base station may configure a UE to monitor a PDCCH in one active BWP and operate in all (e.g., both) active BWPs. As a further example, a base station may configure a UE to monitor a PDCCH, all physical signals, and all physical channels in one active BWP until instructed to switch to another active BWP or until the UE elects to switch to another active BWP (e.g., based on an internal trigger).

A UE may switch from one active BWP to another active BWP based on a slot format type. For example, a UE may use a first active BWP for a half-duplex (HD) slot and use a second active BWP for an FD slot. As another example, a UE may use a first active BWP for a first type of FD slot and used a second active BWP for a second type of FD slot.

A UE may switch from one active BWP to another active BWP based on a signal type. For example, different types of signals may be assigned different priorities. In addition, a base station may configure a UE to use a first active BWP for one type of signal (e.g., a signal associated with a first priority) and use a second active BWP for another type of signal (e.g., a signal associated with a second priority).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
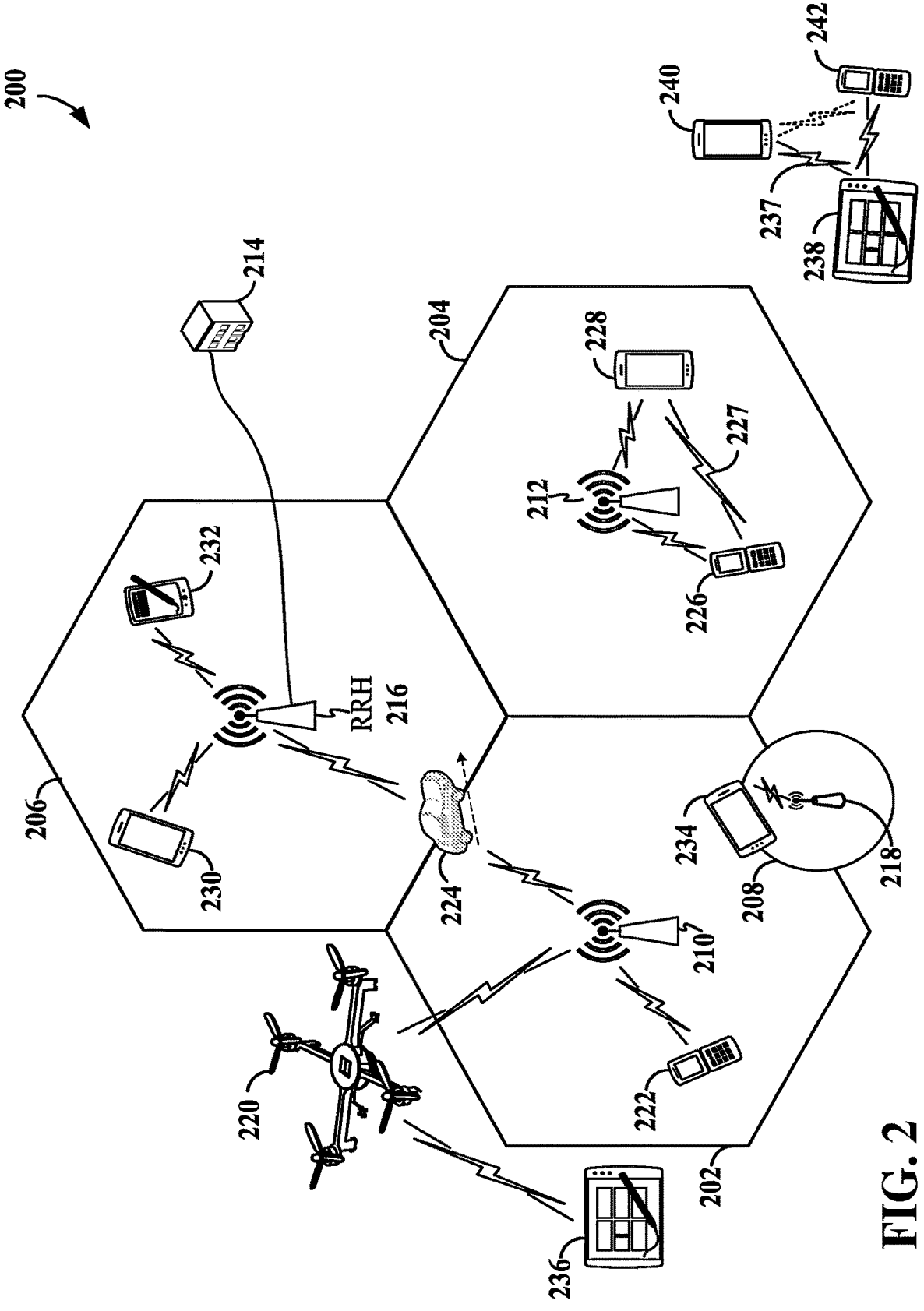
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties. e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
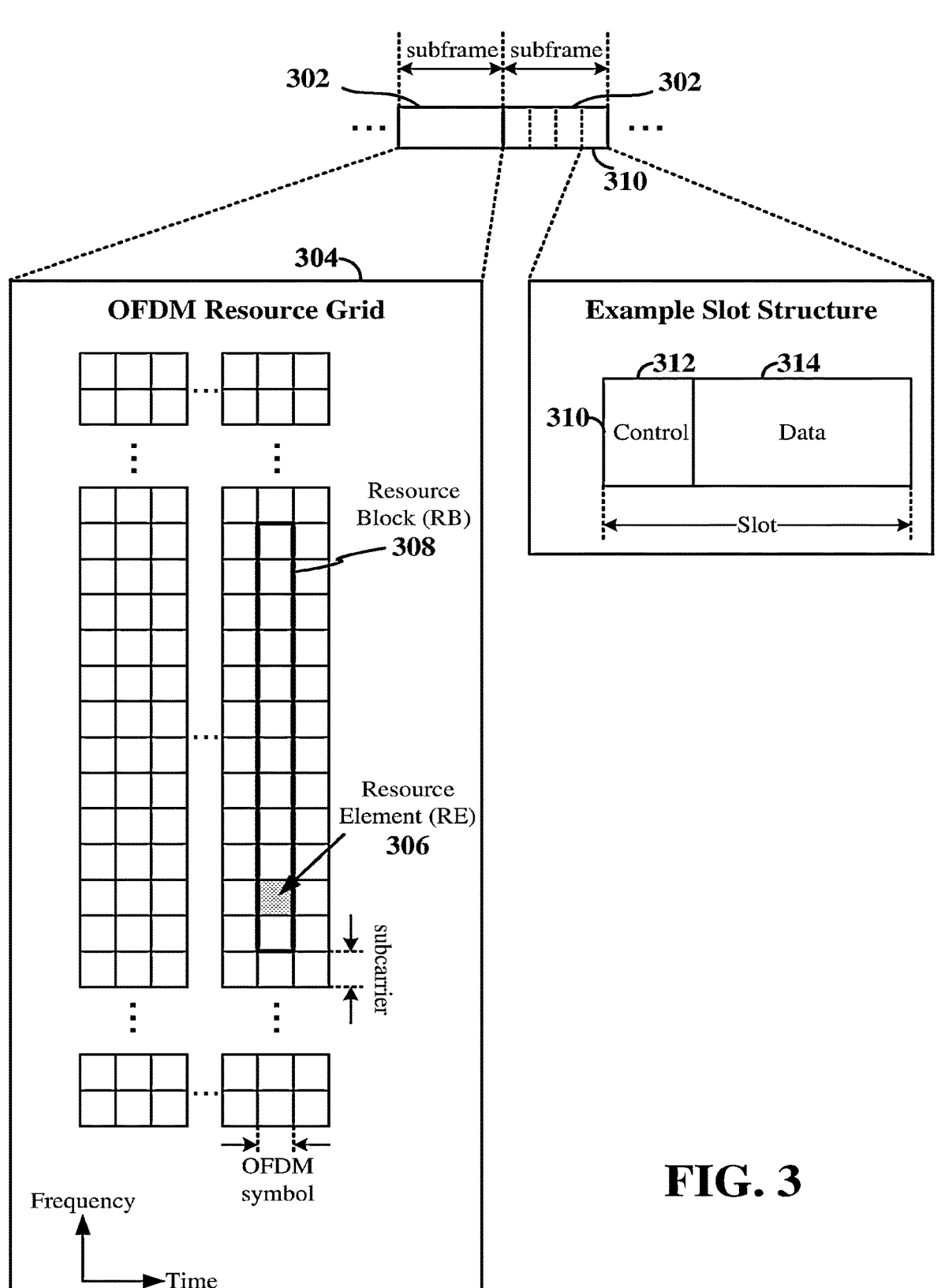
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy. e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ins). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As mentioned above, a UE and a base station (e.g., gNB) may use full-duplex communication. FIGS. 4A, 4B, and 4C are schematic illustrations of a wireless communication network 400 and sources of interference for a full-duplex gNB 402 (e.g., a scheduling entity), a half-duplex UE 406, a first full-duplex UE 412, and a second full-duplex UE 408 according to some aspects of the disclosure. The UE 406, 408, or 412 may correspond to any of the UEs or scheduled entities shown in any of FIGS. 1, 2, 11, 12, and 13.

In FIG. 4A, the full-duplex gNB 402 is transmitting to the half-duplex UE 406. During the time of the transmission from the full-duplex gNB 402 to the half-duplex UE 406, the full-duplex gNB 402 is receiving, at its receiver (not shown), self-interference 410 from its own transmission to the half-duplex UE 406 as well as interference from a neighboring gNB 404 and an uplink transmission from a second full-duplex UE 408. The half-duplex UE 406 is also receiving interference from the second full-duplex UE 408 and the neighboring gNB 404. Because it is a half-duplex UE, the half-duplex UE 406 is not transmitting during the time of the transmission from the full-duplex gNB 402 to the half-duplex UE 406, and therefore, the half-duplex UE 406 receives no self-interference.

In FIG. 4B, the full-duplex gNB 402 is transmitting a downlink transmission to the first full-duplex UE 412. During the time of the transmission of the downlink transmission from the full-duplex gNB 402 to the first full-duplex UE 412, the full-duplex gNB 402 is receiving, at its receiver (not shown), a simultaneous uplink transmission from the first full-duplex UE 412. At the same time as the just mentioned simultaneous downlink and uplink transmissions, the first full-duplex UE 412 is receiving, at its receiver (not shown), self-interference 414 from its own transmission to the full-duplex gNB 402 as well as interference from the neighboring gNB 404 and interference from the second full-duplex UE 408.

In FIG. 4C, the full-duplex gNB 402 is receiving an uplink transmission from the first full-duplex UE 412. During the time of the transmission of the uplink transmission to the full-duplex gNB 402, the first full-duplex UE 412 is also receiving a transmission from a multi-transmission and reception point (TRP) station (e.g., a macro-cell, small cell, pico-cell, femto-cell, remote radio head, relay node, etc.), here represented as a multi-TRP wireless transceiver station 418. In addition to the signal received from the multi-TRP wireless transceiver station 418, the first full-duplex UE 412 is also receiving, at its receiver (not shown), self-interference 416 from its own transmission to the full-duplex gNB 402. The gNB 402, the gNB 404, or the multi-TRP wireless transceiver station 418 may correspond to any of the base stations or scheduling entities shown in any of FIGS. 1, 2, 11, 12, and 16.

For the half-duplex UE 406 of FIG. 4A, interference may be mitigated if the interference from the neighboring gNB 404 and second full-duplex UE 408 are at frequencies other than those occupied by the downlink transmission from the full-duplex gNB 402 to the half-duplex UE 406. Similarly, for the first full-duplex UE 412 of FIGS. 4B and 4C, interference may be mitigated if the self-interference 416 from the first full-duplex UE 412, interference from the neighboring gNB 404, and/or interference from the second full-duplex UE 408 are at frequencies other than those occupied by the downlink transmission from the full-duplex gNB 402 to the half-duplex UE 406.

FIG. 5A is a tabular depiction 500 of a plurality of new radio (NR) operating bands 502 (e.g., radio channels), UL operating band frequencies 504, DL operating band frequencies 506, and duplex modes 508 associated with each of the NR operating bands 502 according to some aspects of the disclosure.

FIG. 5B is a diagram illustrating an FDD FD modulation scheme 510 according to some aspects of the disclosure. In the example shown in FIG. 5B, time is illustrated along the horizontal axis while frequency is illustrated along the vertical axis. A plurality of physical uplink shared channels (PUSCHs) 512 and uplink control channels 514 are depicted as occupying the UL operating band identified as nx $UL_{FDD}$. A plurality of downlink data channels 516 (e.g., physical downlink shared channels (PDSCHs)) and downlink control channels 518 are depicted as occupying the DL operating band identified as nx $DL_{FDD}$. The UL operating band, nx $UL_{FDD}$, and the DL operating band, nx $DL_{FDD}$, are depicted as being separated in frequency by a guard band 520. The paired use of the nx $UL_{FDD}$ uplink operating band and the nx $DL_{FDD}$ operating band of a given, nx operation band may be referred to as paired spectrum. The nomenclature "nx" represents any one of the NR operating bands 502 designated for FDD mode in the duplex modes 508. A sub-group 522 of all NR operating bands 502 designated for FDD mode in the duplex modes 508 is denoted in FIG. 5A. The operating bands are examples and non-limiting.

FIG. 5C is a diagram illustrating a TDD HD modulation scheme 530 according to some aspects of the disclosure. In the example shown in FIG. 5C, time is illustrated along the horizontal axis while frequency is illustrated along the vertical axis. A plurality of downlink data channels 532 and downlink control channels 534 are depicted as occupying the operating band identified as ny UL&DL$_{TDD}$. The single operating band, ny UL&DL$_{TDD}$, is utilized for uplink and downlink by separating the UL and DL information in time (e.g., they do not occupy the same time slots simultaneously). The unpaired use of the nx UL$_{FDD}$ uplink operating band and the nx DL$_{FDD}$ operating band (both at a same frequency, or a same frequency band, of a given, nx operation band may be referred to as unpaired spectrum. A physical uplink shared channel (PUSCH) 536 and uplink control channel 538 are depicted as occupying the single operating band, ny UL&DL$_{TDD}$. The nomenclature "ny" represents any one of the NR operating bands 502 designated for TDD mode in the duplex modes 508. A sub-group 523 of all NR operating bands 502 designated for TDD mode in the duplex modes 508 is denoted in FIG. 5A. The operating bands are examples and non-limiting.

Figures 6A, 6B:
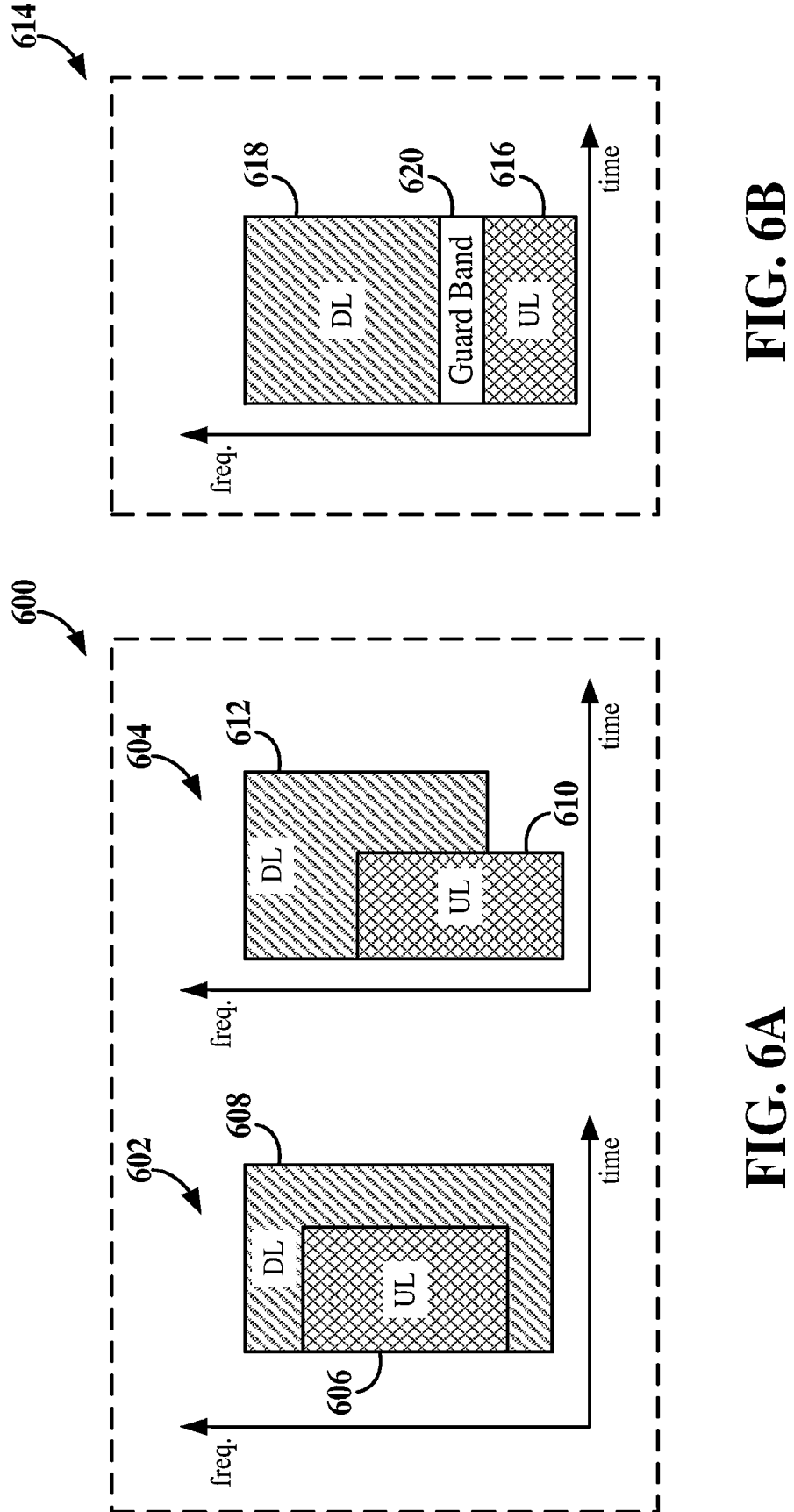
FIG. 6A is a diagram illustrating two examples of inter-band full-duplex (IBFD) modulation according to some aspects.
FIG. 6B is a diagram illustrating an example of sub-band full-duplex (SBFD) according to some aspects.

FIG. 5D is a diagram illustrating an example of a TDD FD modulation scheme 540 according to some aspects of the disclosure. In the example shown in FIG. 5D, time is illustrated along the horizontal axis while frequency is illustrated along the vertical axis. As illustrated in the example diagram of FIG. 5D, a full-duplex network may utilize sub-band FDD (e.g., as illustrated in FIG. 6B) in unpaired spectrum, in which transmissions in different directions are carried in different sub-bands or BWPs of the same carrier bandwidth. A plurality of downlink data channels 544 and downlink control channels 542 and a plurality of PUSCHs 546 and uplink control channels 548 are all depicted as occupying the operating band identified as nz UL&DL$_{FD}$. The single operating band, nz UL&DL$_{FD}$, is utilized for uplink and downlink without separating the UL and DL information in time (e.g., they do occupy the same time slots simultaneously). The nomenclature "nz" represents any one of the NR operating bands 502 designated for TDD mode in the duplex modes 508. A sub-group 523 of all NR operating bands 502 designated for TDD mode in the duplex modes 508 is denoted in FIG. 5A. A first guard band 550 and a second guard band 552 are depicted in FIG. 5D. The first guard band 550 and the second guard band 552 may be the same bandwidth or different bandwidths. Either or both of the first guard band 550 and the second guard band 552 may be zero bandwidth guard bands. The first guard band 550 and the second guard band 552 (individually or collectively) in the unpaired spectrum may be smaller than the guard band 520 in the paired spectrum.

Various examples of TDD FD operation are illustrated in FIGS. 6A and 6B. FIG. 6A is a diagram illustrating two examples of inter-band full-duplex (IBFD) modulation 600 according to some aspects of the disclosure. In the examples shown in FIG. 6A, time is illustrated along the horizontal axis while frequency is illustrated along the vertical axis. A first example 602 of IBFD is depicted on the left while a second example 604 is depicted on the right. In the first example 602, the UL time-frequency resources 606 completely overlap with a portion of the DL time-frequency resources 608. In the second example 604, the UL time-frequency resources 610 partially overlap with a portion of the DL time-frequency resources 612. Accordingly, a device, for example a base station and/or a scheduled entity, employing IBFD may transmit and receive on the same time and frequency resources. That is, the device may transmit and receive at the same time(s) at the same frequency (or frequencies). The UL and DL share the same time and frequency resources. The overlap in time-frequency resources may be complete (full overlap), as in the first example 602, or partial, as in the second example 604.

FIG. 6B is a diagram illustrating an example of sub-band FDD 614 (e.g., xDD) according to some aspects of the disclosure. In the example shown in FIG. 6B, time is illustrated along the horizontal axis while frequency is illustrated along the vertical axis. In sub-band FDD 614, a device may transmit and receive at the same time but on different frequency resources (e.g., within the same carrier bandwidth). In some examples, the different frequency resources may be in unpaired spectrum. The UL resources 616 are separated from the DL resources 618 by a guard band 620. In some scenarios, the guard band 620 may be relatively narrow (e.g., a few RBs). Consequently, a transmission in the UL resources 616 may result in leakage in the DL resources 618, and vice versa.

Figures 7A, 7B:
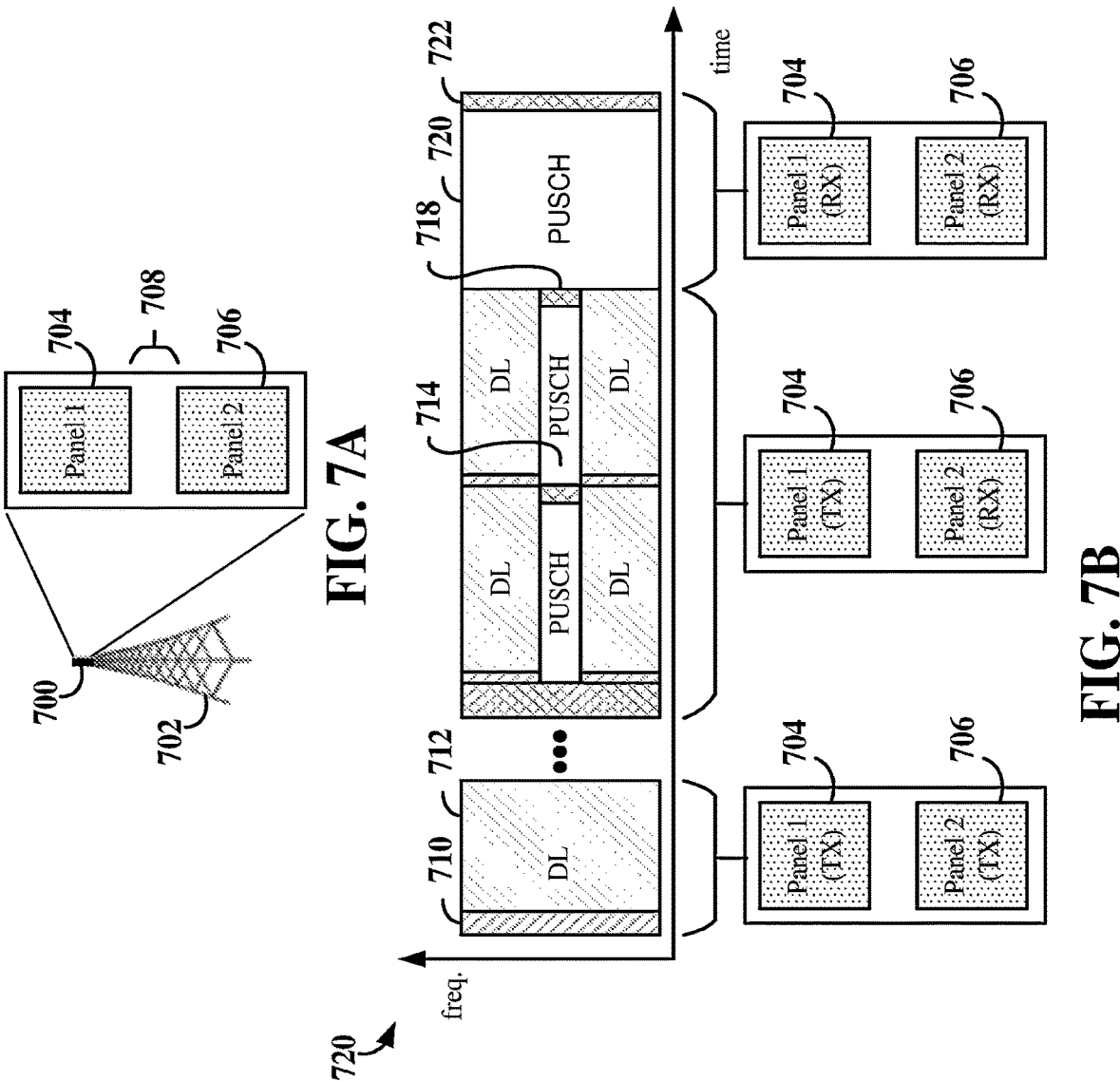
FIG. 7A is a schematic diagram depicting an antenna array according to some aspects.
FIG. 7B is a diagram depicting the transmission or reception configuration of the panel array of FIG. 7A.

FIG. 7A is a schematic diagram depicting an antenna array 700 atop a tower 702 according to some aspects of the disclosure. The discussion that follows also may be applicable to an antenna array in another type of device (e.g., a UE). The antenna array 700 is divided into two panels (panel 1 704, panel 2 706) with a physical separation 708 therebetween. Each of the two panels may be a subarray of antennas. A given panel may transmit and/or receive a beam or a beam group.

FIG. 7B is a diagram depicting the transmission or reception configuration of the two panels (panel 1 704, panel 2 706) of FIG. 7A. The transmission (TX) and reception (RX) configurations of the two panels are depicted for various DL and UL channels as may be implemented in a device (e.g., a scheduling entity or a scheduled entity) practicing FDD according to some aspects of the disclosure.

At the left of FIG. 7B, when the antenna array 700 is only transmitting DL control 710 and DL data 712, both panel 1 704 and panel 2 706 may be configured for transmission. At the center of FIG. 7B, when the antenna array 700 is transmitting a combination of DL control and DL data (similar to DL control 710 and DL data 712) and UL data (e.g., PUSCH 714) and UL control 718, panel 1 704 may be configured for DL transmission and panel 2 706 may be configured for UL reception. At the right of FIG. 7B, when the antenna array 700 is only receiving UL data (e.g., PUSCH 720) and UL control 722, both panel 1 704 and panel 2 706 may be configured for UL reception. The antenna array 700 is thus configured for full-duplex operation. The physical separation 708 between panel 1 704 and panel 2 706 may provide improved isolation between the panels (e.g., greater than about 50 dB of improved isolation) when compared to two panels without the physical separation 708.

Conventionally, the network may configure up to four BWPs for the DL and up to four BWPs for the UL for a UE. The UE may then select one of these configured active BWPs to use for communication. As mentioned above, a BWP may specify the set of useful frequencies for a UE (e.g., a frequency range within an allocated frequency band that the UE is to monitor for DL transmissions). Typically, a BWP is contiguous in frequency.

The amount of time it takes to switch from operating in one active BWP to activating another BWP and then operating in the newly activated BWP (BWP switching time)

may be relatively long as indicated in Table 1 below. In Table 1, Type 1 is for so-called fast switching and Type 2 is for so-called slow switching.

TABLE 1

| | | BWP Switch Delay | |
|---|---|---|---|
| NR Slot Length | | BWP Switch delay $T_{BWPswitchDelay}$ (Slots) | |
| $\mu$ | (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability
Note 2:
If the BWP switch involves changing of sub-carrier spacing (SCS), the BWP switch delay is determined by the larger one between the SCS before BWP switch and the SCS after BWP switch.

A UE may be configured to switch from one BWP to another BWP in different ways. In some scenarios, a base station may send a DCI that includes a BWP indicator that specifies the BWP that the UE is to use. In some scenarios (e.g., for a DL BWP), a UE may switch to a default BWP upon expiration of a timer (e.g., a Bwp-InactivityTimer: ServingCellConfig.bwp-InactivityTimer). In some scenarios, a base station may send radio resource control (RRC) signaling that specifies the BWP that the UE is to use.

In some scenarios, a MAC entity at the UE may initiate a BWP switch. For example, during a random access channel (RACH) procedure, if the current active BWP is not configured for RACH, the UE may switch to a default BWP to find RACH configurations. For example, upon initiation of a RACH procedure, if physical random access channel (PRACH) occasions are not configured for the active UL BWP, the MAC layer may switch the active UL BWP to an initial uplink BWP. In contrast, if PRACH occasions are configured for the active UL BWP, the UE will not need to switch the active UL BWP. For the DL, in some examples, a BWP switch may occur if the serving cell is the SpCell and if the bwp-id of the active DL BWP is different from the bwp-id of the active UL BWP. An SpCell refers to either a primary cell (PCell) (e.g., a Pcell of an MCG) or a primary secondary cell (PSCell) (e.g., of an SCG).

The manner in which a BWP switch occurs may depend on the duplexing method in use. In TDD, a DL and UL BWP switch may occur simultaneously. In FDD, a DL BWP and an UL BWP may switch independently of one another.

The disclosure relates in some aspects to configuring a UE with multiple active BWPs and communication operations relating thereto. Because of the slot format in full-duplex and because of the repetitive switching between HD and FD slots, it may be advantageous for a UE to use at least two active BWPs in the DL and/or at least two active BWPs in the UL. For example, having at least two active BWPs may reduce (e.g., minimize) the BWP switching time and give more flexibility for FD operation.

A full-duplex UE may be configured with two (potentially more) active BWPs in the DL and/or two (potentially more) active BWPs in the UL. Constraints on the two BWPs to be active at the same time may be considered such as respective bandwidth of each BWP, the frequency allocation of each BWP, and PDCCH/PDSCH and semi-persistent scheduling (SPS) configurations of each BWP. Different UEs may react differently to violations of these constraints. In some scenarios, such a violation may be due to a base station sending a common BWP configuration to a group of UEs (to conserve resources), where the common BWP configuration may violate the constraints of one or more of the UEs.

In a first example, a UE may not expect that there will be two BWPs active at the same time (e.g., this configuration may violate the imposed constraints for the UE).

In a second example, if a UE receives a configuration for two BWP active at the same time and this violates the UE's constraints, the UE may drop one of the BWPs. For example, the UE may be configured (by signaling or otherwise) to select the active BWP that has the lowest ID (e.g., the BWP with the highest ID may be dropped).

Figure 8:
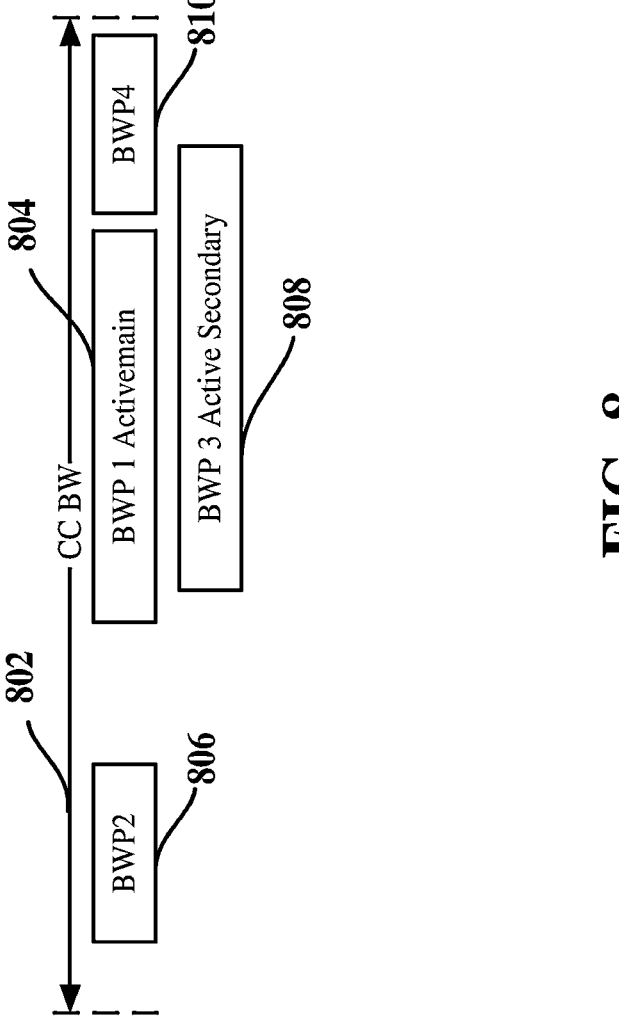
FIG. 8 is a conceptual illustration of an example of allocated bandwidth parts (BWPs) according to some aspects.

The disclosure relates in some aspects to specifying different configurations for different active BWPs. These configurations may relate to for example, default active BWPs to use and/or information carried by particular active BWPs When a full-duplex UE is configured with two active BWPs, one of the two active BWPs may be designated as the main BWP and the other active BWP designated as a secondary BWP. For example, as shown in FIG. 8, for an allocated bandwidth 802 within which a first BWP 804, a second BWP 806, a third BWP 808, and a fourth BWP 810 are defined, the first BWP 804 may be designated as the main active BWP and the third BWP 808 may be designated as the secondary active BWP.

The main and secondary BWPS may be specified in different ways. In some examples, the active BWP with the smaller ID is designated as the main BWP and the active BWP with the larger ID is designated as the secondary BWP. The main and secondary BWPs may be defined via RRC configuration, DCI signaling, MAC-CE signaling, or some other type of signaling.

In some examples, a UE may perform designated operations on designated BWPs. Thus, a UE does not necessarily perform all operations on all BWPs. For example, a UE may be configured to monitor PDCCH, all physical signals, and channels in all (e.g., both) active BWPs. As another example, a UE may be configured to monitor PDCCH in one BWP and operate in all (e.g., both) active BWPs (e.g., in a manner similar to cross-carrier scheduling). As a further example, a UE may be configured to monitor all physical signals and channels in one BWP until the UE is signaled to do otherwise or switch implicitly. The above configurations may be signaling via RRC signaling or some other type of signaling.

Figure 9:
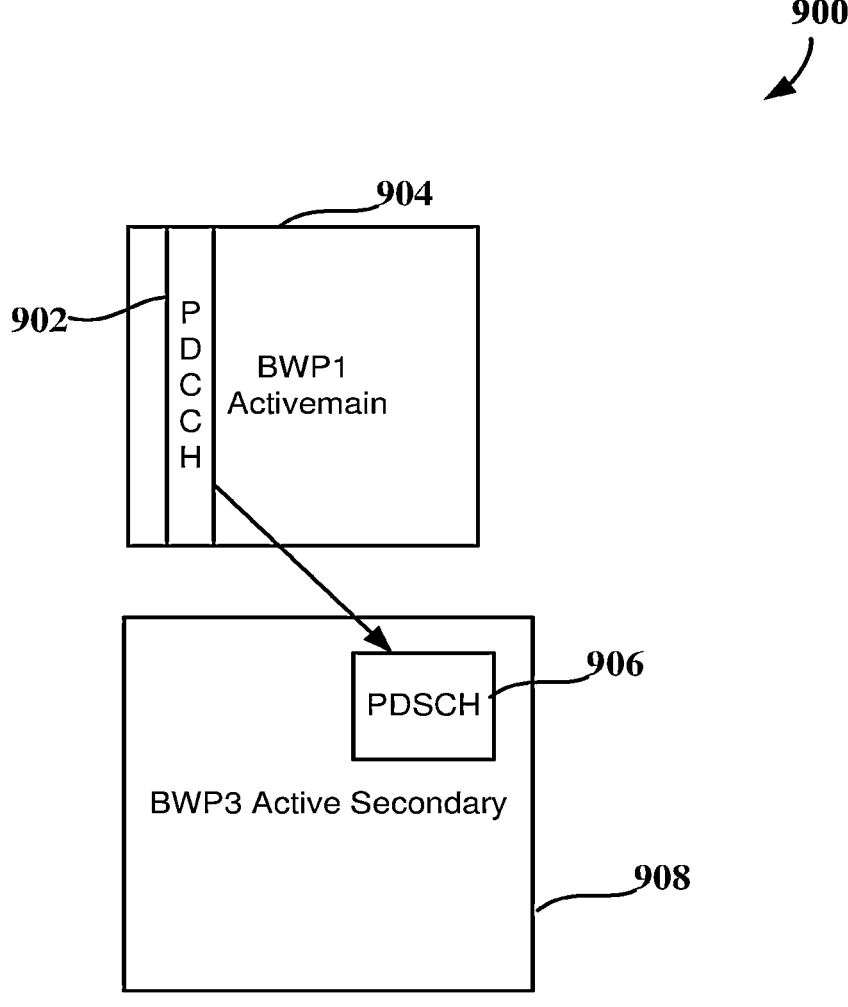
FIG. 9 is a conceptual illustration of an example of cross BWP scheduling according to some aspects.

The disclosure relates in some aspects to cross-BWP scheduling. Here, a UE may be configured to monitor PDCCH in one BWP and operate in one or both BWPs (e.g., receive PDSCH in one or both active BWPs based on scheduling carried by the PDCCH). For example, as shown in the cross-BWP scheduling 900 of FIG. 9, a PDCCH 902 carried by a first active BWP 904 (e.g., the main active BWP) may indicate that a PDSCH 906 is scheduled in a second active BWP 908 (e.g., the secondary active BWP). In some aspects, this may save power when monitoring PDCCH since the UE need not monitor both BWPs. Advantageously, this scheduling might not be constrained by a time delay imposed by BWP switching since the BWP switching time is essentially zero.

A decision as to which active BWP the UE is to monitor may be made in different ways. In some examples, the BWP configuration may include an indication (e.g., one bit) that specifies in which BWP the UE is monitor for PDCCH. In some examples, the UE monitors the PDCCH only in the main BWP.

The disclosure relates in some aspects to implicit switching between active BWPs. A UE may elect to monitor a particular active BWP depending on or more of the following: the slot format (e.g., HD or FD), the FD slot frequency domain format (e.g., UL or DL bandwidth), and the priority of the signals.

Figure 10:
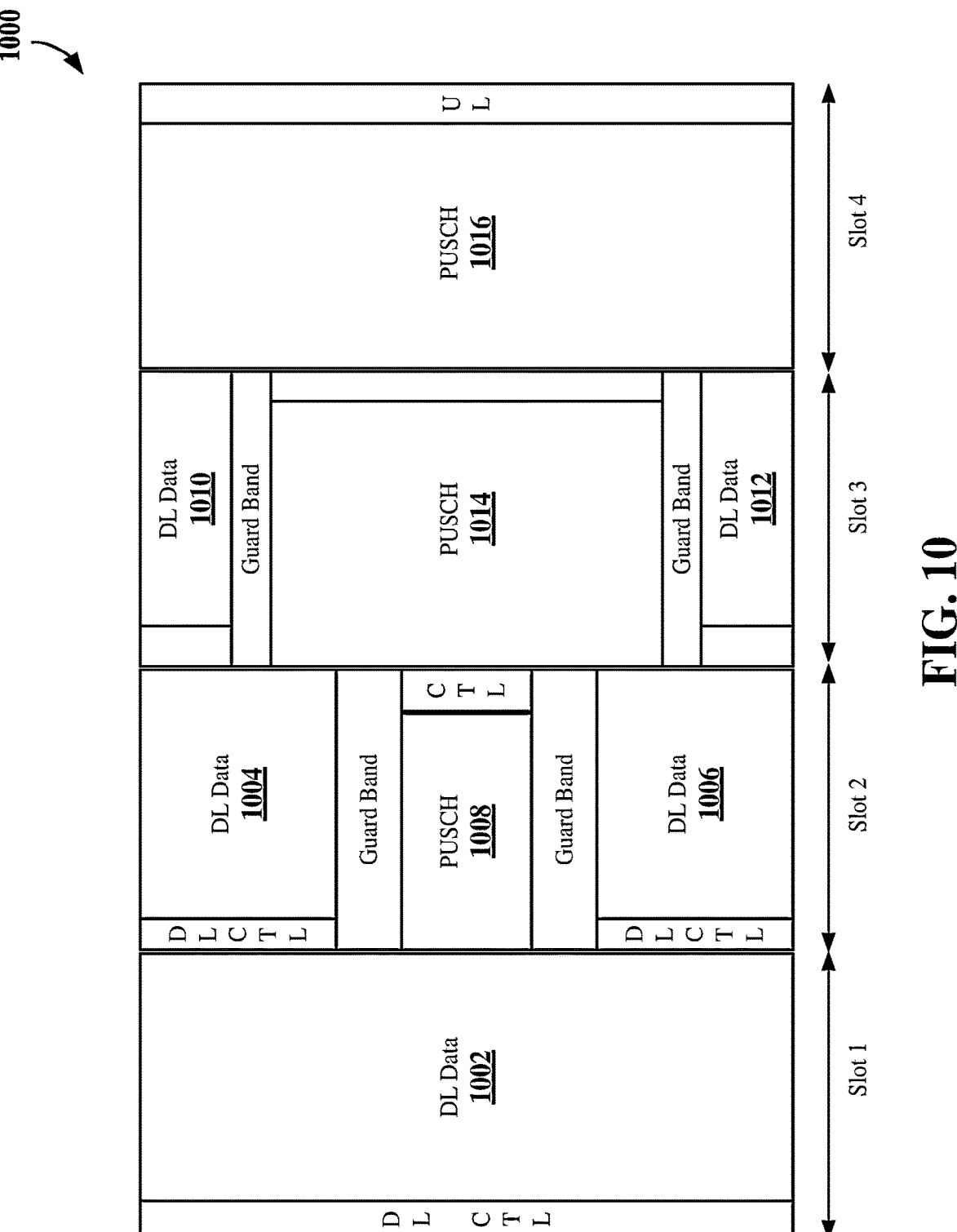
FIG. 10 is a conceptual illustration of an example of different slot formats according to some aspects.

FIG. 10 illustrates a set of time slots (slots) 1000 where different slots have different slot formats. Slot 1 is an HD slot for DL information only (e.g., DL control and DL Data 1002 such a PDSCH) while slot 4 is an HD slot for UL information only (e.g., UL control and UL Data such a PUSCH 1016). In contrast, slots 2 and 3 are F) slots. In some examples, a UE may use a first active BWP (e.g., the main BWP) for slot 1 (HD) and use a second active BWP (e.g., the secondary BWP) for slot 2 (FD). In some examples, a UE may use a first active BWP (e.g., the main BWP with an UL bandwidth <20 MHz) for slot 2 and use a second active BWP (e.g., the secondary BWP with an UL bandwidth >20 MHz) for slot 2. Here, slot 1 and slot 2 are different types of FD slots in that they are defined to carry DL data and PUSCH in different ways. Specifically, a wider bandwidth is supported for DL Data 1004 and 1006 in slot 2 than for DL Data 1010 and 1012 in slot 3. In addition, a wider bandwidth is supported for PUSCH 1014 in slot 3 than for PUSCH 1008 in slot 2. Other types of different FD slots may be used in other examples.

For the signal priority option, each active BWP may be configured with a set of signals and/or channels with a priority level. If the UE is receiving a given high priority level signal, the UE operates on the first active BWP and if the UE is receiving a given low priority level signal, the UE operates on the second active BWP. In addition, the two active BWPs can be configured with different sub-carrier spacings (SCSs) to support different latency requirements.

Figure 11:
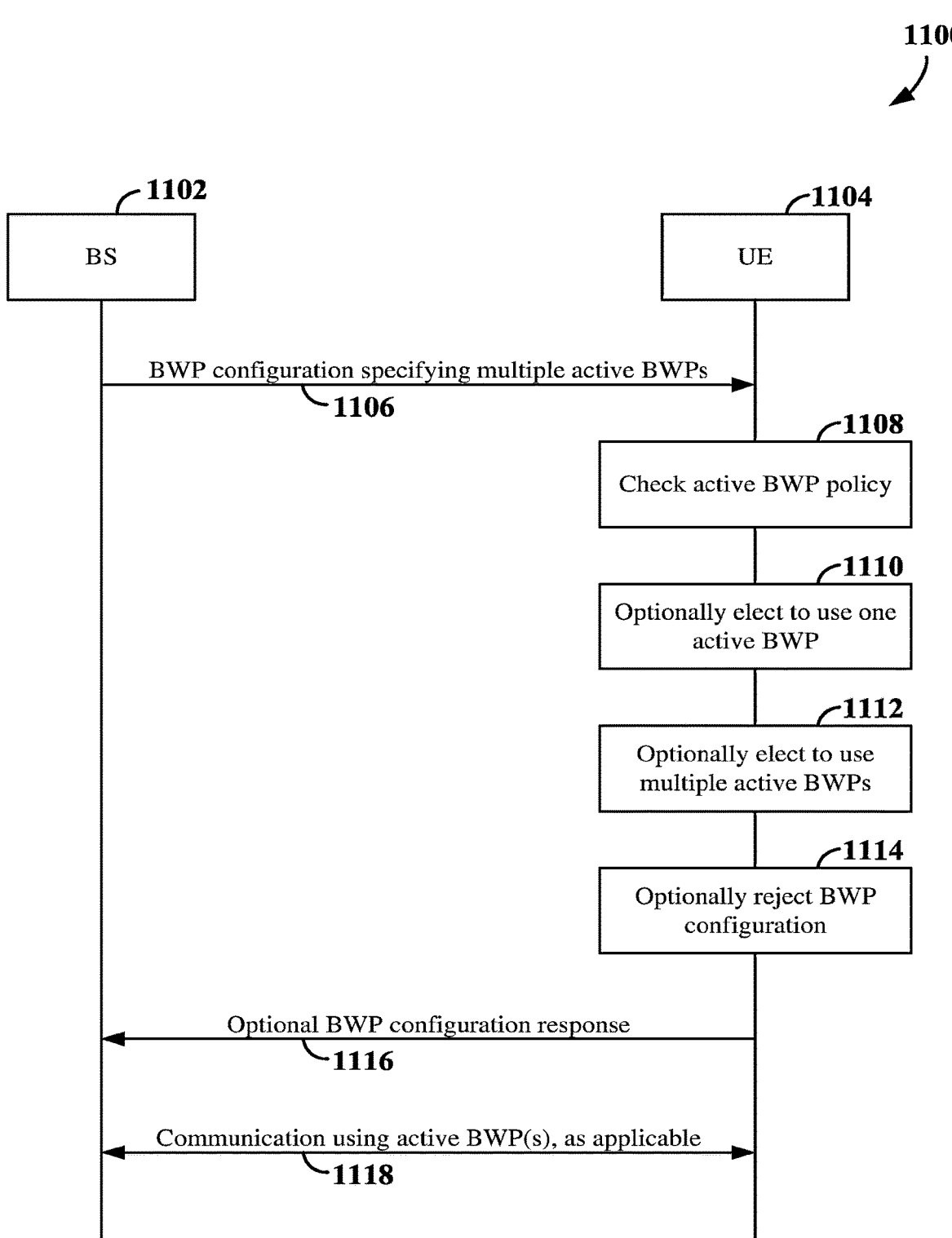
FIG. 11 is a signaling diagram illustrating an example of BWP-related signaling between a UE and a base station according to some aspects.

FIG. 11 illustrates an example of signaling 1100 in a wireless communication network including a BS 1102 and a UE 1104. In some examples, the UE 1104 may correspond to any of the UEs or scheduled entities shown in any of FIGS. 1, 2, 4A, 4B. 4C, 12, and 13. In some examples, the BS 1102 may correspond to one or more of the BSs or scheduling entities shown in any of FIGS. 1, 2, 4A, 4B, 4C, 12, and 16.

At 1106 of FIG. 11, the BS 1102 sends a BWP configuration to the UE 1104. The BWP configuration specifies multiple (e.g., two) active BWPs.

At 1108, the UE 1104 checks the BWP configuration against the UE's active BWP policies. These policies may relate to, for example, the respective bandwidth of each BWP (UL or DL), the frequency allocation of each BWP, and the PDCCH, PDSCH, SPS, PUCCH, PUSCH, and SRS configurations of each BWP.

At optional 1110, the UE 1104 may elect to use only one of the active BWPs. For example, the use of two active BWPs (as configured by the network) may violate a policy of the UE 1104.

At optional 1112, the UE 1104 may elect to use two or more of the active BWPs. For example, the use of all active BWPs (as configured by the network) may be supported by the UE 1104.

At optional 1114, the UE 1104 may elect to reject the BWP configuration. For example, the use of the active BWPs (as configured by the network) may violate a policy of the UE 1104 and the UE may flag the BWP configuration as an error.

At optional 1116, the UE 1104 may send a BWP configuration response to the BS 1102. For example, the response may indicate whether the UE 1104 will use none, one, or two of the active BWPs.

At 1118, the UE 1104 and the BS 1102 may communicate via one or more of the active BWPs that the UE 1104 elected to use. These active BWPs may be for the UL or the DL.

Figure 12:
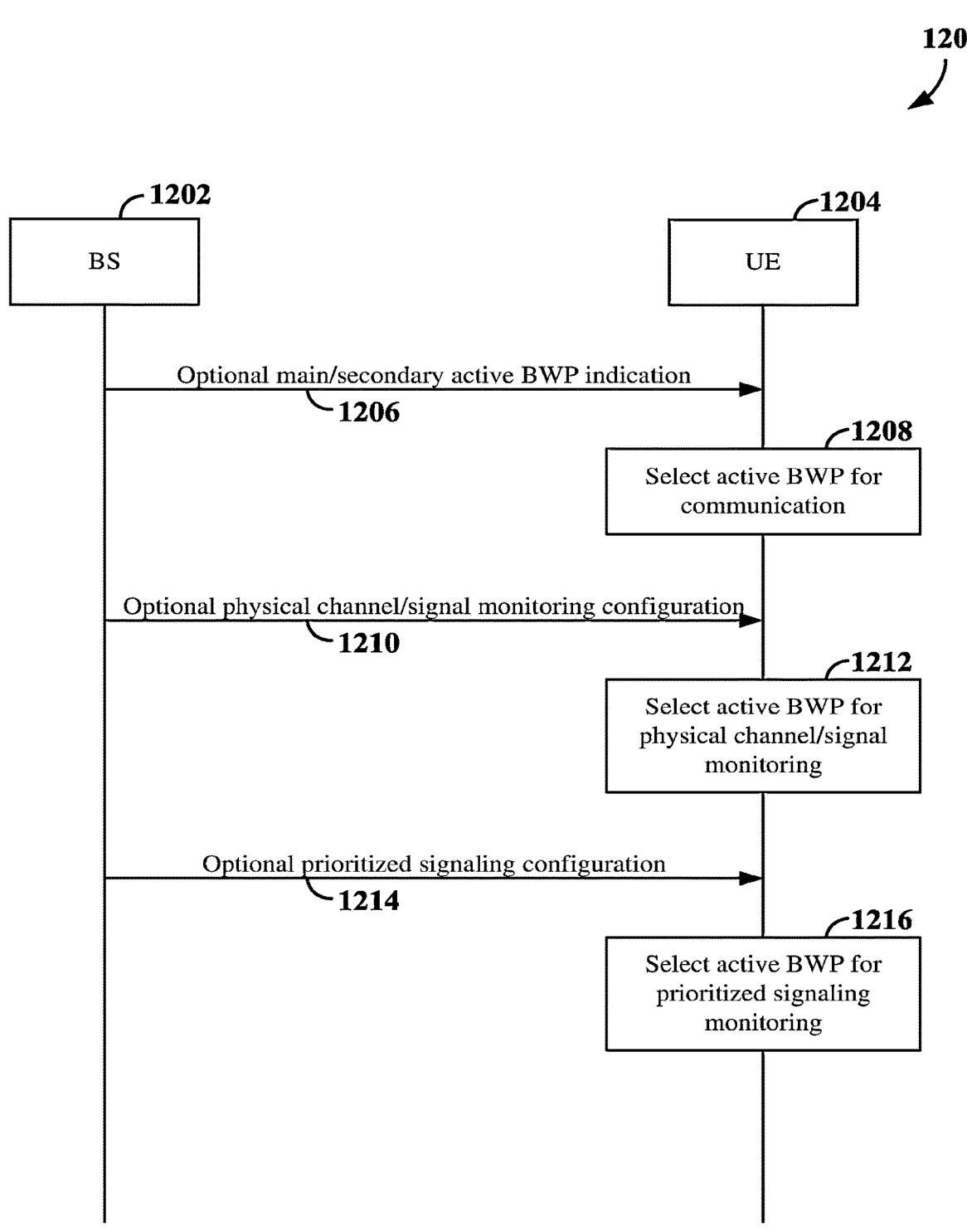
FIG. 12 is a signaling diagram illustrating another example of BWP-related signaling between a UE and a base station according to some aspects.

FIG. 12 illustrates an example of signaling 1200 in a wireless communication network including a BS 1202 and a UE 1204. In some examples, the UE 1204 may correspond to any of the UEs or scheduled entities shown in any of FIGS. 1, 2, 4A, 4B. 4C, 11, and 13. In some examples, the BS 1202 may correspond to one or more of the BSs or scheduling entities shown in any of FIGS. 1, 2, 4A, 4B, 4C, 11, and 16.

At optional 1206 of FIG. 12, the BS 602 may send a configuration to the UE 604. The configuration specifies which active BWP is the main active BWP.

At 1208, the UE 1204 selects an active BWP to use for a communication operation. In some examples, the UE 1204 may select the main active BWP as signaled at 1206. In some examples, the UE 1204 may select an active BWP based on an identifier of the active BWP (e.g., the active BWP with the lowest ID).

At optional 1210, the BS 602 may send another configuration to the UE 604. This configuration specifies which active BWPs to use for channel and/or signal monitoring.

At 1212, the UE 1204 selects an active BWP to use for channel and/or signal monitoring. In some examples, the UE 1204 may select the active BWP as signaled at 1210. In some examples, the UE 1204 may select an active BWP based on some other configuration.

At optional 1214, the BS 602 may send another configuration to the UE 604. This configuration specifies which active BWPs are to be used for different types of signals (e.g., different priority signals).

At 1212, the UE 1204 selects an active BWP to use for receiving a particular type of signal (e.g., a high priority signal or a low priority signal). In some examples, the UE 1204 may select the active BWP as signaled at 1214. In some examples, the UE 1204 may select an active BWP based on some other configuration.

Figure 13:
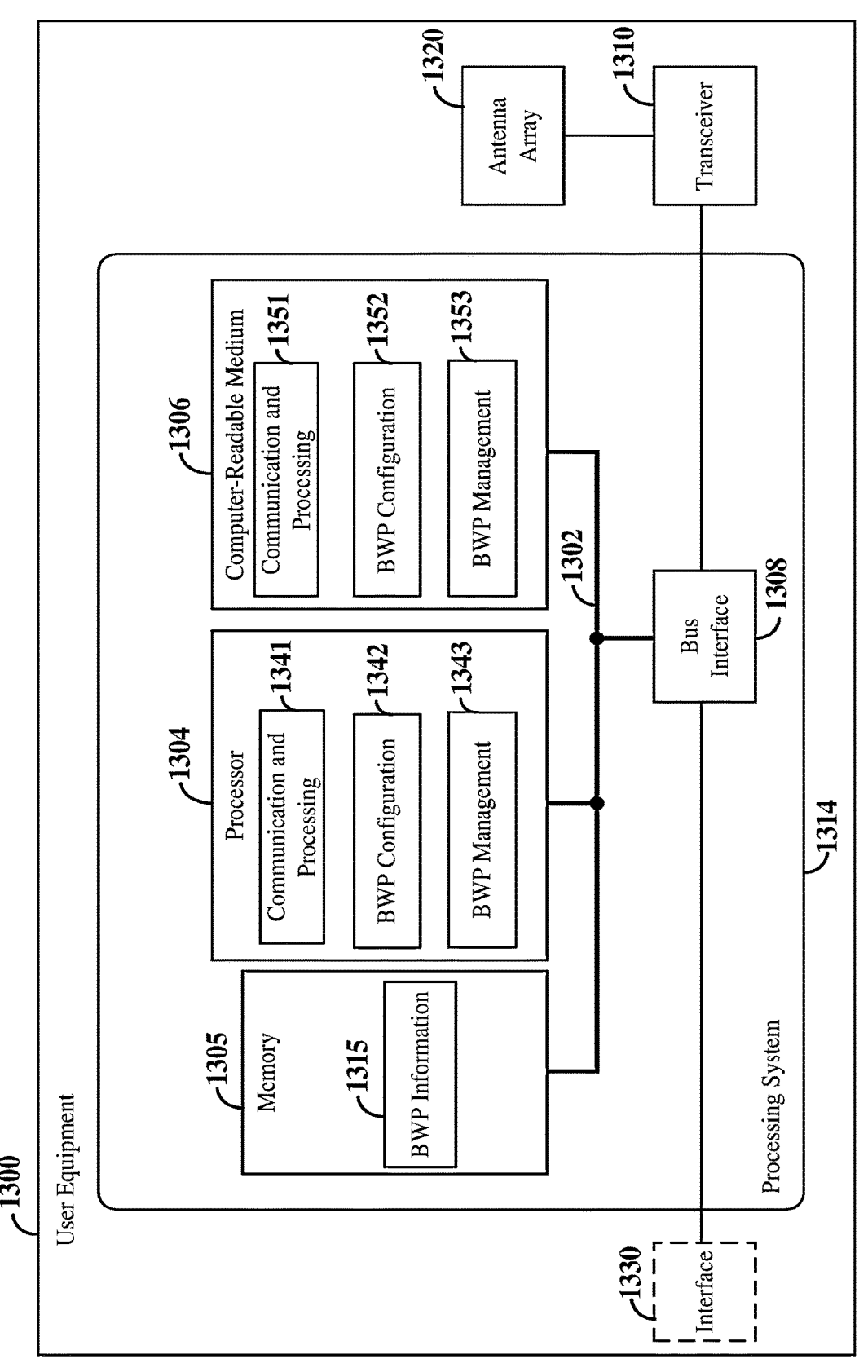
FIG. 13 is a block diagram illustrating an example of a hardware implementation for a user equipment employing a processing system according to some aspects.

FIG. 13 is a block diagram illustrating an example of a hardware implementation for a UE 1300 employing a processing system 1314. For example, the UE 1300 may be a device configured to wirelessly communicate with a base station, as discussed in any one or more of FIGS. 1-12. In some implementations, the UE 1300 may correspond to any of the UEs or scheduled entities shown in any of FIGS. 1, 2, and 6.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described herein.

The processor 1304 may in some instances be implemented via a baseband or modem chip and in other implementations, the processor 1304 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and an antenna array 1320, and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store BWP information 1315 used by the processor 1304 for communication operations as described herein.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1300 may be configured to perform any one or more of the operations described herein (e.g., as described above in conjunction with FIGS. 1-12 and as described below in conjunction with FIGS. 14-15). In some aspects of the disclosure, the processor 1304, as utilized in the UE 1300, may include circuitry configured for various functions.

The processor 1304 may include communication and processing circuitry 1341. The communication and processing circuitry 1341 may be configured to communicate with a base station, such as a gNB. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains. The communication and processing circuitry 1341 may further be configured to execute communication and processing software 1351 included on the computer-readable medium 1306 to implement one or more functions described herein.

In some examples, the communication and processing circuitry 1341 may be configured to receive and process downlink beamformed signals at a mmWave frequency or a sub-6 GHz frequency via the transceiver 1310 and an antenna array 1320. For example, the communication and processing circuitry 1341 may be configured to receive a respective reference signal (e.g., SSB or CSI-RS) on each of a plurality of downlink beams from the base station during a downlink beam sweep via at least one first antenna panel of the antenna array 1320. The communication and processing circuitry 1341 may further be configured to transmit a beam measurement report to the base station.

In some examples, the communication and processing circuitry 1341 may further be configured to generate and transmit uplink beamformed signals at a mmWave frequency or a sub-6 GHz frequency via the transceiver 1310 and the antenna array 1320. For example, the communication and processing circuitry 1341 may be configured to transmit a respective reference signal (e.g., SRS or DMRS) on each of a plurality of uplink beams to the base station during an uplink beam sweep via at least one second antenna panel of the antenna array 1320.

The communication and processing circuitry 1341 may further be configured to generate and transmit a request to the base station. For example, the request may be included in a MAC-CE carried in a PUSCH, UCI in a PUCCH or PUSCH, a random access message, or an RRC message. The communication and processing circuitry 1341 may further be configured to generate and transmit a scheduling request (e.g., via UCI in a PUCCH) to the base station to receive an uplink grant for the PUSCH carrying the MAC-CE including the request for uplink beam refinement.

The communication and processing circuitry 1341 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 1341 may further be configured to control the antenna array 1320 and the transceiver 1310 to search for and identify a plurality of downlink transmit beams during a downlink beam sweep. The communication and processing circuitry 1341 may further be configured to obtain a plurality of beam measurements on each of a plurality of downlink receive beams via the antenna array 1320 for each of the identified downlink transmit beams. The communication and processing circuitry 1341 may further be configured to generate a beam measurement report for transmission to the base station using the communication and processing circuitry 1341.

The communication and processing circuitry 1341 may further be configured to identify one or more selected uplink beam(s) based on the beam measurements obtained from the downlink beam reference signals. In some examples, the communication and processing circuitry 1341 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1341 may be configured to generate one or more uplink transmit beams for transmission in an uplink beam sweep. Each uplink transmit beam may carry an uplink reference signal (e.g., an SRS) for measurement by the base station. The communication and processing circuitry 1341 may further be configured to identify the selected uplink transmit beam(s) selected by the base station based on the uplink beam measurements. For example, the communication and processing circuitry 1341 may be configured to receive an indication of the selected uplink transmit beam(s) from the base station.

In some implementations where the communication involves receiving information, the communication and processing circuitry 1341 may obtain information from a component of the UE 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving. In some examples, the communication and processing circuitry 1341 may include functionality for a means for decoding.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., a means for transmitting). In some examples, the communication and processing circuitry 1341 may include functionality for a means for encoding.

In some examples, the communication and processing circuitry 1341 may include functionality for a means for communicating information. For example, the communication and processing circuitry 1341 may be configured to transmit data to a gNB via an uplink resource (e.g., PUSCH) scheduled by a DCI received by the UE 1300. As another example, the communication and processing circuitry 1341 may be configured to receive data from a gNB via a downlink resource (e.g., PDSCH) scheduled by a DCI received by the UE 1300. As a further example, the communication and processing circuitry 1341 may be configured to communicate with a gNB via an UL BWP and/or a DL BWP.

The processor 1304 may include BWP configuration circuitry 1342 configured to perform BWP configuration-related operations (e.g., as discussed herein in conjunction with FIGS. 4-12). The BWP configuration circuitry 1342 may be configured to execute BWP configuration software 1352 included on the computer-readable medium 1306 to implement one or more functions described herein.

The BWP configuration circuitry 1342 may include functionality for a means for receiving BWP configuration information. For example, the BWP configuration circuitry 1342 may be configured to receive a message including a BWP configuration from a gNB via downlink signaling. In addition, the BWP configuration circuitry 1342 may be configured to process the message to recover the BWP configuration.

The processor 1304 may include BWP management circuitry 1343 configured to perform BWP management-related operations (e.g., as discussed herein in conjunction with FIGS. 4-12). The BWP management circuitry 1343 may be configured to execute BWP management software 1353 included on the computer-readable medium 1306 to implement one or more functions described herein.

The BWP management circuitry 1343 may include functionality for a means for selecting an active BWP. For example, the BWP management circuitry 1343 may be configured to select at least one active BWP based on one or more of the techniques described herein in conjunction with FIGS. 8-12.

The BWP management circuitry 1343 may include functionality for a means for determining that BWP configuration information is a violation of a constraint. For example, the BWP management circuitry 1343 may be configured to compare a BWP configuration with the user equipment's capability information to determine whether there is a violation of a constraint.

The BWP management circuitry 1343 may include functionality for a means for abstaining from communicating via at least one of the first active BWP or the second active BWP as a result of the violation of the at least one BWP constraint for the user equipment. For example, the BWP management circuitry 1343 may be configured to designate the BWP configuration as an error condition.

Figure 14:
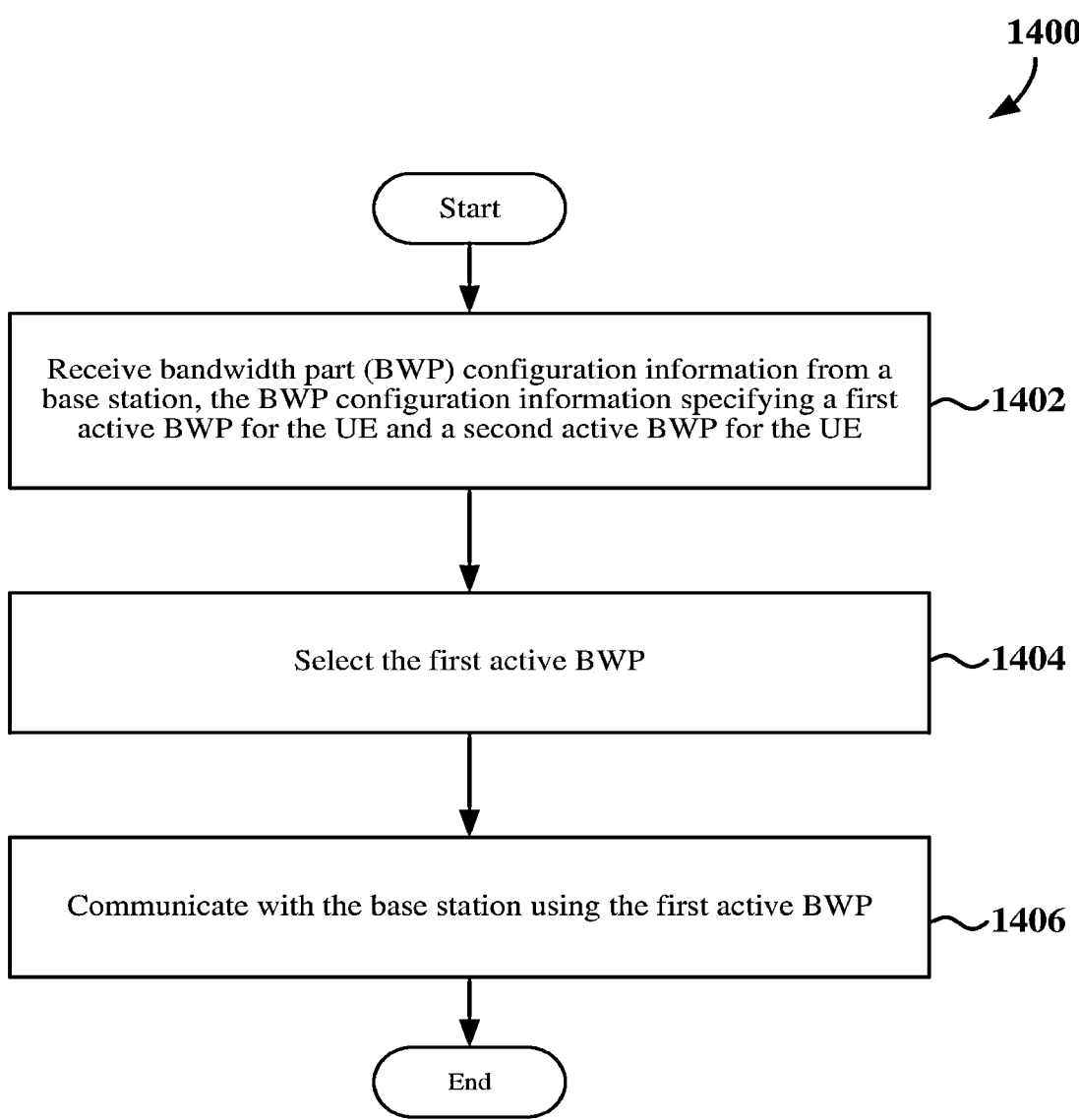
FIG. 14 is a flow chart of an example method using multiple active BWPs according to some aspects.

FIG. 14 is a flow chart illustrating an example method 1400 for wireless communication (e.g., xDD communication or another form of wireless communication) according to some aspects. As described below, some or all illustrated features may be omitted in a particular implementation within the scope of the present disclosure, and some illustrated features may not be required for implementation of all examples. In some examples, the method 1400 may be carried out by the user equipment 1300 illustrated in FIG. 13 or by any suitable apparatus or means for carrying out the functions or algorithm described below.

At block 1402, a user equipment may receive bandwidth part (BWP) configuration information from a base station, the BWP configuration information specifying a first active BWP for the user equipment and a second active BWP for the user equipment. For example, the BWP configuration circuitry 1342 together with the communication and processing circuitry 1341 and the transceiver 1310, shown and described above in connection with FIG. 13, may provide a means to receive bandwidth part (BWP) configuration information from a base station.

In some examples, the BWP configuration information further specifies at least one third active BWP for the user equipment. In some examples, the BWP configuration information may include a common BWP configuration for a plurality of user equipments. In some examples, receiving the BWP configuration information from the base station may include receiving the BWP configuration information via a radio resource control (RRC) message.

At block 1404, the user equipment may select the first active BWP. For example, the BWP management circuitry 1343, shown and described above in connection with FIG. 13, may provide a means to select the first active BWP.

In some examples, selecting the first active BWP may include comparing a first identifier of the first active BWP to a second identifier of the second active BWP, determining that the first identifier has a lower value than the second identifier, and selecting the first active BWP for the communicating with the base station after determining that the first identifier has a lower value than the second identifier.

In some examples, selecting the first active BWP may include determining that the first active BWP is designated as a main active BWP. In some examples, the second active BWP is designated as a secondary active BWP.

At block 1406, the user equipment may communicate with the base station using the first active BWP. For example, the BWP management circuitry 1343 together with the communication and processing circuitry 1341 and the transceiver 1310, shown and described above in connection with FIG. 13, may provide a means to communicate with the base station using the first active BWP.

The user equipment may receive different types of configuration information. In some examples, user equipment may receive a first configuration information specifying that the first active BWP is designated as the main active BWP and the second active BWP is designated as the secondary active BWP. In some examples, the user equipment may receive a first configuration information specifying that the user equipment is to monitor physical channels and physical signals in both the first active BWP and the second active BWP. In some examples, the user equipment may receive a first configuration information specifying that the user equipment is to monitor a physical downlink control channel (PDCCH) in the first active BWP, and communicate physical downlink shared channel (PDSCH) information in both the first active BWP and the second active BWP. In some examples, the user equipment may receive a first configuration information specifying that the user equipment is to monitor physical channels and physical signals in the first active BWP until the user equipment is signaled to monitor a different active BWP. In some examples, the user equipment may receive a first configuration information specifying that the user equipment is to monitor physical channels and physical signals in the first active BWP until the user equipment elects to monitor a different active BWP.

In some examples, the user equipment may receive an indication that specifies in which active BWP the user equipment is to monitor a physical downlink control channel (PDCCH).

In some examples, the user equipment may determine that the first active BWP is designated as a main active BWP, and monitor a physical downlink control channel (PDCCH) in the first active BWP as a result of determining that the first active BWP is designated as the main active BWP.

In some examples, the user equipment may receive a downlink control information (DCI) via a physical downlink control channel (PDCCH) in the first active BWP, wherein the DCI identifies a physical downlink shared channel (PDSCH) in the second active BWP, and transmit or receive information in the PDSCH in the second active BWP as a result of receiving the DCI.

In some examples, the user equipment may identify a switch from a first time slot format to a second time slot format, and switch from communicating in the first active BWP for the first time slot format to communicating in the second active BWP for the second time slot format. In some examples, the first time slot format is a half-duplex (HD) format, and the second time slot format is a full-duplex (FD) format. In some examples, the first time slot format is a first type of full-duplex (FD) format, and the second time slot format is a second type of FD format. In some examples, the first type of FD format is for a first uplink or downlink band with a first bandwidth that is less than a threshold bandwidth, and the second type of FD format is for a second uplink or downlink band with a second bandwidth that is greater than the threshold bandwidth.

In some examples, the user equipment may receive configuration information specifying that the first active BWP carries a first type of signal or channel and the second active BWP carries a second type of signal or channel. In some examples, the user equipment may receive scheduling information indicating communication of the first type of signal or channel, and select the first active BWP for the communication of the first type of signal or channel. In some examples, the first type of signal or channel has a higher priority than the second type of signal or channel. In some examples, the first active BWP is configured for a first sub-carrier spacing (SCS) and the second active BWP is configured for a second SCS different from the first SCS.

In some examples, the user equipment may select the second active BWP, wherein the communicating with the base station using the first active BWP may include full-duplex communication using the first active BWP and the second active BWP. In some examples, the full-duplex communication using the first active BWP and the second active BWP may include concurrently transmitting first information to the base station via the first active BWP and receiving second information from the base station via the second active BWP.

FIG. 15 is a flow chart illustrating an example method 1500 for wireless communication (e.g., xDD communication or another form of wireless communication) according to some aspects. In some examples, one or more aspects of the method 1500 may be implemented in conjunction with (e.g., as part of and/or in addition to) the method 800 of FIG. 8. As described below, some or all illustrated features may be omitted in a particular implementation within the scope of the present disclosure, and some illustrated features may not be required for implementation of all examples. In some examples, the method 1500 may be carried out by the user equipment 1300 illustrated in FIG. 13 or by any suitable apparatus or means for carrying out the functions or algorithm described below.

At block 1502, a user equipment may receive bandwidth part (BWP) configuration information from a base station, the BWP configuration information specifying a first active BWP for the user equipment and a second active BWP for the user equipment. For example, the BWP configuration circuitry 1342 together with the communication and processing circuitry 1341 and the transceiver 1310, shown and described above in connection with FIG. 13, may provide a means to receive bandwidth part (BWP) configuration information from a base station.

In some examples, the BWP configuration information may include a common BWP configuration for a plurality of user equipments including the first user equipment. In some examples, receiving the BWP configuration information from the base station may include receiving the BWP configuration information via a radio resource control (RRC) message.

At block 1504, the user equipment may determine that the BWP configuration information specifying the first active BWP for the user equipment and the second active BWP for the user equipment is a violation of at least one BWP constraint for the user equipment. For example, the BWP management circuitry 1343, shown and described above in connection with FIG. 13, may provide a means to determine that the BWP configuration information specifying the first active BWP for the user equipment and the second active BWP for the user equipment is a violation of at least one BWP constraint for the user equipment.

In some examples, determining that the BWP configuration information specifying the first active BWP for the user equipment and the second active BWP for the user equipment is a violation of at least one BWP constraint for the user equipment is based on a BWP bandwidth constraint for the user equipment. In some examples, the BWP bandwidth constraint specifies that a sum of a first bandwidth of the first active BWP and a second bandwidth of the second active BWP is to be less than a threshold bandwidth.

In some examples, determining that the BWP configuration information specifying the first active BWP for the user equipment and the second active BWP for the user equipment is a violation of at least one BWP constraint for the user equipment is based on a BWP frequency allocation constraint for the user equipment. In some examples, the BWP frequency allocation constraint specifies a minimum guard band between the first active BWP and the second active BWP.

In some examples, determining that the BWP configuration information specifying the first active BWP for the user equipment and the second active BWP for the user equipment is a violation of at least one BWP constraint for the user equipment is based on at least one channel configuration for a BWP for the user equipment. In some examples, the at least one channel configuration for a BWP specifies that a first physical downlink control channel (PDCCH) configuration of the second active BWP is a function of a second PDCCH configuration of the first active BWP.

In some examples, determining that the BWP configuration information specifying the first active BWP for the user equipment and the second active BWP for the user equipment is a violation of at least one BWP constraint for the user equipment is based on a semi-persistent scheduling (SPS) constraint for a BWP for the user equipment.

In some examples, determining that the BWP configuration information specifying the first active BWP for the user equipment and the second active BWP for the user equipment is a violation of at least one BWP constraint for the user equipment may include categorizing the BWP configuration information specifying a first active BWP and a second active BWP as an error condition.

At block 1506, the user equipment may abstain from communicating via at least one of the first active BWP or the second active BWP as a result of the violation of the at least one BWP constraint for the user equipment. For example, the BWP management circuitry 1343, shown and described above in connection with FIG. 13, may provide a means to abstain from communicating via at least one of the first active BWP or the second active BWP as a result of the violation of the at least one BWP constraint for the user equipment.

In some examples, abstaining from communicating via at least one of the first active BWP or the second active BWP may include abstaining from communicating via either of the first active BWP or the second active BWP. In some examples, abstaining from communicating via at least one of the first active BWP or the second active BWP may include communicating via the first active BWP, and abstaining from communicating via the second active BWP.

In some examples, the user equipment may compare a first identifier of the first active BWP to a second identifier of the first active BWP, determine that the first identifier has a lower value than the second identifier, and select the first active BWP for communication based on the determining that the first identifier has a lower value than the second identifier.

In one configuration, the user equipment 1300 includes means for receiving bandwidth part (BWP) configuration information from a base station, the BWP configuration information specifying a first active BWP for the user equipment and a second active BWP for the user equipment, means for selecting the first active BWP, and means for communicating with the base station using the first active BWP. In one configuration, the user equipment 1300 includes means for receiving bandwidth part (BWP) configuration information from a base station, the BWP configuration information specifying a first active BWP for the user equipment and a second active BWP for the user equipment, means for determining that the BWP configuration information specifying the first active BWP for the user equipment and the second active BWP for the user equipment is a violation of at least one BWP constraint for the user equipment, and means for abstaining from communicating via at least one of the first active BWP or the second active BWP as a result of the violation of the at least one BWP constraint for the user equipment. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 4A. 4B, 4C, 11, 12, and 13, and utilizing, for example, the methods and/or algorithms described herein in relation to FIGS. 14-15.

Figure 16:
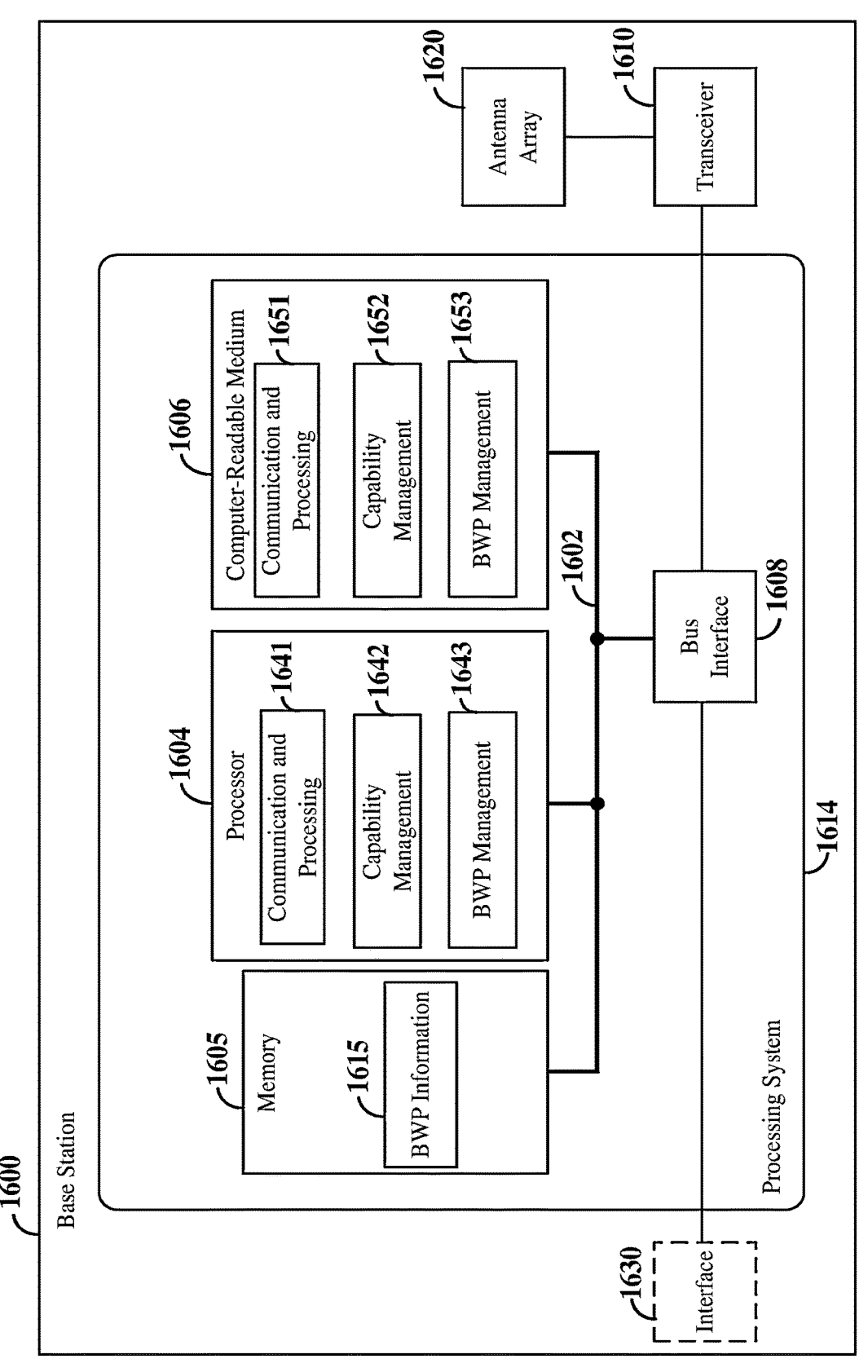
FIG. 16 is a block diagram illustrating an example of a hardware implementation for a base station employing a processing system according to some aspects.

FIG. 16 is a conceptual diagram illustrating an example of a hardware implementation for base station (BS) 1600 employing a processing system 1614. In some implementations, the BS 1600 may correspond to any of the BSs (e.g., gNBs) or scheduling entities shown in any of FIGS. 1, 2, 4A. 4B, 4C. 11, and 12.

In accordance with various aspects of the disclosure, an element, or any portion of an element, or any combination of elements may be implemented with the processing system 1614. The processing system may include one or more processors 1604. The processing system 1614 may be substantially the same as the processing system 1314 illustrated in FIG. 13, including a bus interface 1608, a bus 1602, memory 1605, a processor 1604, a computer-readable medium 1606, a transceiver 1610, and an antenna array 1620. The memory 1605 may store BWP information 1615 used by the processor 1604 for communication operations as described herein. Furthermore, the BS 1600 may include an interface 1630 (e.g., a network interface) that provides a means for communicating with at least one other apparatus within a core network and with at least one radio access network.

The BS 1600 may be configured to perform any one or more of the operations described herein (e.g., as described above in conjunction with FIGS. 1-12 and as described below in conjunction with FIG. 17). In some aspects of the disclosure, the processor 1604, as utilized in the BS 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple UEs. The processor 1604 may be configured to schedule resources for the transmission of downlink signals (e.g., SSBs). The processor 1604 may further be configured to schedule resources for the transmission of uplink signals.

The processor 1604 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1604 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1604 may further be configured to schedule resources that may be utilized by the UE to transmit the request. For example, the uplink beam refinement request resources may include resources scheduled for transmission of a PUCCH. PUSCH, PRACH occasion or RRC message. In some examples, the processor 1604 may be configured to schedule PUSCH resources for the uplink beam refinement request in response to receiving a scheduling request from the UE.

The processor 1604 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1604 may include communication and processing circuitry 1641. The communication and processing circuitry 1644 may be configured to communicate with a UE. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

In some examples, the communication and processing circuitry 1641 may be configured to receive and process uplink beamformed signals at a mmWave frequency or a sub-6 GHz frequency via the transceiver 1610 and an antenna array 1620. For example, the communication and processing circuitry 1641 may be configured to receive a respective reference signal (e.g., SRS or DMRS) on each of a plurality of uplink beams from the UE during an uplink beam sweep.

In some examples, the communication and processing circuitry 1641 may further be configured to generate and transmit downlink beamformed signals at a mmWave frequency or a sub-6 GHz frequency via the transceiver 1610 and the antenna array 1620. For example, the communication and processing circuitry 1641 may be configured to transmit a respective downlink reference signal (e.g., SSB or CSI-RS) on each of a plurality of downlink beams to the UE during a downlink beam sweep via at least one first antenna panel of the antenna array 1620. The communication and processing circuitry 1641 may further be configured to receive a beam measurement report from the UE.

The communication and processing circuitry 1641 may further be configured to receive a request from the UE. For example, the request may be included in a MAC-CE carried in a PUSCH. UCI in a PUCCH or PUSCH, a random access message, or an RRC message. The communication and processing circuitry 1641 may further be configured to receive a scheduling request (e.g., via UCI in a PUCCH) from the UE for an uplink grant for the PUSCH carrying the MAC-CE including the request for uplink beam refinement.

The communication and processing circuitry 1641 may further be configured to receive an uplink signal on one or more uplink receive beams via one or more uplink transmit beams applied to the uplink signal. For example, the communication and processing circuitry 1641 may be configured to receive the uplink signal on one or more uplink receive beams via at least one second antenna panel of the antenna array 1620. The uplink signal may include, for example, a PUCCH. PUSCH, SRS, DMRS, or PRACH.

The communication and processing circuitry 1641 may further be configured to control the antenna array 1620 and transceiver 1610 to generate a plurality of downlink transmit beams during a downlink beam sweep. The communication and processing circuitry 1641 may further be configured to receive a beam measurement report from the UE using the communication and processing circuitry 1644. The communication and processing circuitry 1641 may further be configured to identify one or more selected uplink beam(s) based on the beam measurements. In some examples, the communication and processing circuitry 1641 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

In some implementations wherein the communication involves receiving information, the communication and processing circuitry 1641 may obtain information from a component of the BS 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

In some examples, the communication and processing circuitry 1641 may include functionality for a means for communicating information. For example, the communication and processing circuitry 1641 may transmit data to a user equipment via a downlink resource (e.g., PDSCH) scheduled by a DCI sent to the user equipment. As another example, the communication and processing circuitry 1641 may receive data from a user equipment via an uplink resource (e.g., PUSCH) scheduled by a DCI sent to the user equipment.

The processor 1604 may include capability management circuitry 1642 configured to perform user equipment capability management-related operations (e.g., as discussed herein in conjunction with FIGS. 4-12). The capability management circuitry 1642 may be configured to execute capability management software 1652 included on the computer-readable medium 1606 to implement one or more functions described herein.

The capability management circuitry 1642 may include functionality for a means for receiving capability information. For example, the capability management circuitry 1642 may be configured to receive capability information on an uplink channel (e.g., receive a UE capability message via an RRC signaling on a PUSCH) and process the capability information to identify at least one BWP constraint for at least one user equipment.

The processor 1604 may include BWP management circuitry 1643 configured to perform BWP management-related operations (e.g., as discussed herein in conjunction with FIGS. 4-12). The BWP management circuitry 1643 may be configured to execute BWP management software 1653 included on the computer-readable medium 1606 to implement one or more functions described herein.

The BWP management circuitry 1643 may include functionality for a means for generating BWP configuration information. For example, the BWP management circuitry 1643 may be configured to generate the BWP configuration (e.g., based on resource usage in the system and/or resource usage requirements of particular UEs).

The BWP management circuitry 1643 may include functionality for a means for transmitting BWP configuration information. For example, the BWP management circuitry 1643 may be configured to cooperate with the communication and processing circuitry 1641 and the transceiver 1610 to unicast or broadcast the BWP configuration.

FIG. 17 is a flow chart illustrating an example method 1700 for wireless communication (e.g., xDD communication or another form of wireless communication) according to some aspects. As described below, some or all illustrated features may be omitted in a particular implementation within the scope of the present disclosure, and some illustrated features may not be required for implementation of all examples. In some examples, the method 1700 may be carried out by the BS 1600 illustrated in FIG. 16 or by any suitable apparatus or means for carrying out the functions or algorithm described below.

At block 1702, a base station may receive capability information from a first user equipment, the capability information specifying at least one bandwidth part (BWP) constraint for the first user equipment. For example, the capability management circuitry 1642 together with the communication and processing circuitry 1641 and the transceiver 1610, shown and described above in connection with FIG. 16, may provide a means to receive capability information from a first user equipment.

At block 1704, the base station may generate BWP configuration information based at least in part on the capability information from the first user equipment, the BWP configuration information specifying a first active BWP and a second active BWP. For example, the BWP management circuitry 1643, shown and described above in connection with FIG. 16, may provide a means to generate BWP configuration information based at least in part on the capability information from the first user equipment.

In some examples, the BWP configuration information may include a common BWP configuration for a plurality of user equipments including the first user equipment.

At block 1706, the base station may transmit the BWP configuration information. For example, the BWP management circuitry 1643 together with the communication and processing circuitry 1641 and the transceiver 1610, shown and described above in connection with FIG. 16, may provide a means to transmit the BWP configuration information.

In some examples, the base station may determine whether the first user equipment will communicate in the first active BWP, and selectively communicating with the first user equipment in at least one of the first active BWP or the second active BWP based on whether the first user equipment will communicate in the first active BWP. In some examples, determining whether the first user equipment will communicate in the first active BWP is based on at least one of the at least one BWP constraint for the first user equipment, a configuration of the first user equipment that specifies a main active BWP and a secondary active BWP, a first identifier of the first active BWP, a configuration of the first user equipment that specifies an active BWP to be monitored, a configuration of the first user equipment that specifies an active BWP for monitoring a physical downlink control channel (PDCCH), a configuration of the first user equipment that specifies first signaling carried by the first active BWP, a transition between a half-duplex (HD) slot and a full-duplex (FD) slot, a transition from a first type of FD slot and second type of FD slot, or any combination thereof.

In some examples, the at least one BWP constraint for the first user equipment specifies at least one of a BWP bandwidth constraint, a BWP frequency allocation constraint, at least one channel configuration for a BWP, a semi-persistent scheduling constraint for a BWP, or any combination thereof. In some examples, the first identifier of the first active BWP has a lower value than a second identifier of the second active BWP. In some examples, the first signaling carried by the first active BWP has a higher priority than second signaling carried by the second active BWP. In some examples, the first type of FD slot carries first uplink traffic with a first bandwidth, and the second type of FD slot carries second uplink traffic with a second bandwidth that is wider than the first bandwidth.

In some examples, determining whether the first user equipment will communicate in the first active BWP may include determining that the first user equipment will communicate in the first active BWP, and selectively communicating with the first user equipment in at least one of the first active BWP or the second active BWP based on whether the first user equipment will communicate in the first active BWP may include transmitting downlink information to the first user equipment via the first active BWP or receiving uplink information from the first user equipment via the first active BWP after determining that the first user equipment will communicate in the first active BWP.

In some examples, determining whether the first user equipment will communicate in the first active BWP may include determining that the first user equipment will not communicate in the first active BWP, and selectively communicating with the first user equipment in at least one of the first active BWP or the second active BWP based on whether the first user equipment will communicate in the first active BWP may include transmitting downlink information to the first user equipment via the second active BWP or receiving uplink information from the first user equipment via the second active BWP after determining that the first user equipment will not communicate in the first active BWP.

In some examples, the base station may transmit configuration information specifying that the first active BWP is a main active BWP and the second active BWP is a secondary active BWP. In some examples, the base station may transmit configuration information specifying that the first user equipment is to monitor physical channels and physical signals in both the first active BWP and the second active BWP. In some examples, the base station may transmit configuration information specifying that the first user equipment is to monitor a physical downlink control channel (PDCCH) in the first active BWP, and communicate physical downlink shared channel (PDSCH) information in both the first active BWP and the second active BWP. In some examples, the base station may transmit configuration information specifying that the first user equipment is to monitor physical channels and physical signals in the first active BWP until the first user equipment is signaled to monitor a different active BWP. In some examples, the base station may transmit configuration information specifying that the first user equipment is to monitor physical channels and physical signals in the first active BWP until the first user equipment elects to monitor a different active BWP.

In some examples, the base station may transmit configuration information specifying that the first active BWP carries a first type of signal or channel and the second active BWP carries a second type of signal or channel. In some examples, the method may further include transmitting scheduling information indicating communication of the first type of signal or channel. In some examples, the first type of signal or channel has a higher priority than the second type of signal or channel. In some examples, the first active BWP is configured for a first sub-carrier spacing (SCS) and the second active BWP is configured for a second SCS different from the first SCS.

In some examples, the base station may determine that the first user equipment will not communicate in either of the first active BWP or the second active BWP, and transmit additional BWP configuration information to the first user equipment after determining that the first user equipment will not communicate in either of the first active BWP or the second active BWP. In some examples, determining that the first user equipment will not communicate in either of the first active BWP or the second active BWP may include determining that the first user equipment will categorize the BWP configuration information specifying a first active BWP and a second active BWP as an error condition. In some examples, determining that the first user equipment will not communicate in either of the first active BWP or the second active BWP is based on at least one of a BWP bandwidth constraint, a BWP frequency allocation constraint, at least one channel configuration for a BWP, a semi-persistent scheduling constraint for a BWP, or any combination thereof.

In one configuration, the BS 1600 includes means for receiving capability information from a first user equipment, the capability information specifying at least one bandwidth part (BWP) constraint for the first user equipment, means for generating BWP configuration information based at least in part on the capability information from the user equipment, the BWP configuration information specifying a first active BWP and a second active BWP, and means for transmitting the BWP configuration information. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 4A, 4B, 4C, 11, 12, and 16, and utilizing, for example, the methods and/or algorithms described herein in relation to FIG. 17.

The methods shown in FIGS. 14, 15, and 17 may include additional aspects, such as any single aspect or any combination of aspects described below and/or in connection with one or more other processes described elsewhere herein.

In some examples, a method of wireless communication at a base station may include receiving capability information from a first user equipment, the capability information specifying at least one bandwidth part (BWP) constraint for the first user equipment, generating BWP configuration information based at least in part on the capability information from the user equipment, the BWP configuration information specifying a first active BWP and a second active BWP, and transmitting the BWP configuration information.

In some examples, a base station may include a transceiver, a memory, and a processor communicatively coupled to the transceiver and the memory. The processor and the memory may be configured to receive capability information from a first user equipment, the capability information specifying at least one bandwidth part (BWP) constraint for the first user equipment, generate BWP configuration information based at least in part on the capability information from the user equipment, the BWP configuration information specifying a first active BWP and a second active BWP, and transmit the BWP configuration information via the transceiver.

In some examples, a base station may include means for receiving capability information from a first user equipment, the capability information specifying at least one bandwidth part (BWP) constraint for the first user equipment, means for generating BWP configuration information based at least in part on the capability information from the user equipment, the BWP configuration information specifying a first active BWP and a second active BWP, and means for transmitting the BWP configuration information.

In some examples, an article of manufacture for use by a base station includes a computer-readable medium having stored therein instructions executable by one or more processors of the base station to receive capability information from a first user equipment, the capability information specifying at least one bandwidth part (BWP) constraint for the first user equipment, generate BWP configuration information based at least in part on the capability information from the user equipment, the BWP configuration information specifying a first active BWP and a second active BWP, and transmit the BWP configuration information.

The above may also include determining whether the first user equipment will communicate in the first active BWP and selectively communicating with the first user equipment in at least one of the first active BWP or the second active BWP based on whether the first user equipment will communicate in the first active BWP. Determining whether the first user equipment will communicate in the first active BWP may be based on at least one of the at least one BWP constraint for the first user equipment, a configuration of the first user equipment that specifies a main active BWP and a secondary active BWP, a first identifier of the first active BWP, a configuration of the first user equipment that specifies an active BWP to be monitored, a configuration of the first user equipment that specifies an active BWP for monitoring a physical downlink control channel (PDCCH), a configuration of the first user equipment that specifies first signaling carried by the first active BWP, a transition between a half-duplex (HD) slot and a full-duplex (FD) slot, a transition from a first type of FD slot and second type of FD slot, or any combination thereof. The at least one BWP constraint for the first user equipment may specify at least one of a BWP bandwidth constraint, a BWP frequency allocation constraint, at least one channel configuration for a BWP, a semi-persistent scheduling constraint for a BWP, or any combination thereof.

The following provides an overview of several aspects of the present disclosure.

Aspect 1: A method for wireless communication at a user equipment, the method comprising: receiving bandwidth part configuration information from a base station, the bandwidth part configuration information specifying a first active bandwidth part for the user equipment and a second active bandwidth part for the user equipment; selecting the first active bandwidth part; and communicating with the base station using the first active bandwidth part.

Aspect 2: The method of aspect 1, wherein the selecting the first active bandwidth part comprises: comparing a first identifier of the first active bandwidth part to a second identifier of the second active bandwidth part; determining that the first identifier has a lower value than the second identifier; and selecting the first active bandwidth part for the communicating with the base station after determining that the first identifier has the lower value than the second identifier.

Aspect 3: The method of aspect 1 or 2, wherein: the selecting the first active bandwidth part comprises determining that the first active bandwidth part is designated as a main active bandwidth part; and the second active bandwidth part is designated as a secondary active bandwidth part.

Aspect 4: The method of aspect 3, further comprising receiving first configuration information specifying that the first active bandwidth part is designated as the main active bandwidth part and the second active bandwidth part is designated as the secondary active bandwidth part.

Aspect 5: The method of any of aspects 1 through 4, further comprising receiving first configuration information specifying that the user equipment is to: monitor physical channels and physical signals in both the first active bandwidth part and the second active bandwidth part; monitor a physical downlink control channel in the first active bandwidth part and communicate physical downlink shared channel information in both the first active bandwidth part and the second active bandwidth part; monitor the physical channels and physical signals in the first active bandwidth part until the user equipment is signaled to monitor a different active bandwidth part; or monitor the physical channels and physical signals in the first active bandwidth part until the user equipment elects to monitor the different active bandwidth part.

Aspect 6: The method of any of aspects 1 through 5, further comprising receiving an indication that specifies in which active bandwidth part the user equipment is to monitor a physical downlink control channel.

Aspect 7: The method of any of aspects 1 through 6, further comprising: determining that the first active bandwidth part is designated as a main active bandwidth part; and monitoring a physical downlink control channel in the first active bandwidth part as a result of the determining that the first active bandwidth part is designated as the main active bandwidth part.

Aspect 8: The method of any of aspects 1 through 7, further comprising: receiving a downlink control information via a physical downlink control channel in the first active bandwidth part, wherein the downlink control information identifies a physical downlink shared channel in the second active bandwidth part; and transmitting or receiving information in the physical downlink shared channel in the second active bandwidth part as a result of the receiving the downlink control information.

Aspect 9: The method of any of aspects 1 through 8, further comprising: identifying a switch from a first time slot format to a second time slot format; and switching from communicating in the first active bandwidth part for the first time slot format to communicating in the second active bandwidth part for the second time slot format.

Aspect 10: The method of aspect 9, wherein: the first time slot format is a half-duplex format and the second time slot format is a full-duplex format; or the first time slot format is a first type of full-duplex format and the second time slot format is a second type of full-duplex format.

Aspect 11: The method of aspect 10, wherein: the first type of full-duplex format is for a first uplink or downlink band with a first bandwidth that is less than a threshold bandwidth; and the second type of full-duplex format is for a second uplink or downlink band with a second bandwidth that is greater than the threshold bandwidth.

Aspect 12: The method of any of aspects 1 through 11, further comprising: receiving first configuration information specifying that the first active bandwidth part carries a first type of signal or channel and the second active bandwidth part carries a second type of signal or channel.

Aspect 13: The method of aspect 12, further comprising: receiving scheduling information indicating communication of the first type of signal or channel; and selecting the first active bandwidth part for the communication of the first type of signal or channel.

Aspect 14: The method of any of aspects 12 through 13, wherein: the first type of signal or channel has a higher priority than the second type of signal or channel; or the first active bandwidth part is configured for a first sub-carrier spacing and the second active bandwidth part is configured for a second sub-carrier spacing different from the first sub-carrier spacing.

Aspect 16: A method for wireless communication at a user equipment, the method comprising: receiving bandwidth part configuration information from a base station, the bandwidth part configuration information specifying a first active bandwidth part for the user equipment and a second active bandwidth part for the user equipment; determining that the bandwidth part configuration information specifying the first active bandwidth part for the user equipment and the second active bandwidth part for the user equipment is a violation of at least one bandwidth part constraint for the user equipment; and abstaining from communicating via at least one of the first active bandwidth part or the second active bandwidth part as a result of the violation of the at least one bandwidth part constraint for the user equipment.

Aspect 17: The method of aspect 16, wherein the determining that the bandwidth part configuration information specifying the first active bandwidth part for the user equipment and the second active bandwidth part for the user equipment is the violation of the at least one bandwidth part constraint for the user equipment is based on a bandwidth part bandwidth constraint for the user equipment.

Aspect 18: The method of aspect 17, wherein the bandwidth part bandwidth constraint specifies that a sum of a first bandwidth of the first active bandwidth part and a second bandwidth of the second active bandwidth part is to be less than a threshold bandwidth.

Aspect 19: The method of any of aspects 16 through 18, wherein the determining that the bandwidth part configuration information specifying the first active bandwidth part for the user equipment and the second active bandwidth part for the user equipment is the violation of the at least one bandwidth part constraint for the user equipment is based on a bandwidth part frequency allocation constraint for the user equipment.

Aspect 20: The method of aspect 19, wherein the bandwidth part frequency allocation constraint specifies a minimum guard band between the first active bandwidth part and the second active bandwidth part.

Aspect 21: The method of any of aspects 16 through 20, wherein the determining that the bandwidth part configuration information specifying the first active bandwidth part for the user equipment and the second active bandwidth part for the user equipment is the violation of the at least one bandwidth part constraint for the user equipment is based on at least one channel configuration for a bandwidth part for the user equipment.

Aspect 22: The method of aspect 21, wherein the at least one channel configuration for the bandwidth part specifies that a first physical downlink control channel configuration of the second active bandwidth part is a function of a second physical downlink control channel configuration of the first active bandwidth part.

Aspect 23: The method of any of aspects 16 through 22, wherein the determining that the bandwidth part configuration information specifying the first active bandwidth part for the user equipment and the second active bandwidth part for the user equipment is the violation of the at least one bandwidth part constraint for the user equipment is based on a semi-persistent scheduling constraint for a bandwidth part for the user equipment.

Aspect 24: The method of any of aspects 16 through 23, wherein the determining that the bandwidth part configuration information specifying the first active bandwidth part for the user equipment and the second active bandwidth part for the user equipment is the violation of the at least one bandwidth part constraint for the user equipment comprises: categorizing the bandwidth part configuration information specifying the first active bandwidth part for the user equipment and the second active bandwidth part for the user equipment as an error condition.

Aspect 25: The method of aspect 24, wherein the abstaining from communicating via at least one of the first active bandwidth part or the second active bandwidth part comprises abstaining from communicating via either of the first active bandwidth part or the second active bandwidth part.

Aspect 26: The method of any of aspects 16 through 25, wherein the abstaining from communicating via at least one of the first active bandwidth part or the second active bandwidth part comprises: communicating via the first active bandwidth part; and abstaining from communicating via the second active bandwidth part.

Aspect 27: The method of aspect 26, further comprising: comparing a first identifier of the first active bandwidth part to a second identifier of the first active bandwidth part; determining that the first identifier has a lower value than the second identifier: and selecting the first active bandwidth part for communication based on the determining that the first identifier has the lower value than the second identifier.

Aspect 28: The method of any of aspects 16 through 27, wherein the bandwidth part configuration information comprises a common bandwidth part configuration for a plurality of user equipments.

Aspect 29: The method of any of aspects 16 through 28, wherein the receiving the bandwidth part configuration information from the base station comprises: receiving the bandwidth part configuration information via a radio resource control message.

Aspect 30: A user equipment comprising: a transceiver configured to communicate with a radio access network, a memory, and a processor communicatively coupled to the transceiver and the memory, wherein the processor and the memory are configured to perform any one of aspects 1 through 14.

Aspect 31: An apparatus configured for wireless communication comprising at least one means for performing any one of aspects 1 through 1145.

Aspect 32: A non-transitory computer-readable medium storing computer-executable code, comprising code for causing an apparatus to perform any one of aspects 1 through 14.

Aspect 33: A user equipment comprising: a transceiver, a memory, and a processor communicatively coupled to the transceiver and the memory, wherein the processor and the memory are configured to perform any one of aspects 16 through 29.

Aspect 34: An apparatus configured for wireless communication comprising at least one means for performing any one of aspects 16 through 29.

Aspect 35: A non-transitory computer-readable medium storing computer-executable code, comprising code for causing an apparatus to perform any one of aspects 16 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4A, 4B, 4C. 11, 12, 13, and 16 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
at least one transceiver;
one or more memories that store processor-executable code; and
one or more processors configured to execute the processor-executable code to cause the apparatus to:
receive, via the at least one transceiver and from a network entity, bandwidth part configuration information specifying a first active bandwidth part associated with the apparatus and a second active bandwidth part associated with the apparatus;
select the first active bandwidth part;
communicate, via the at least one transceiver, with the network entity, the communication via the first active bandwidth part being associated with a first time slot format; and
after a switch from the first time slot format to a second time slot format, switch, via the at least one transceiver, from the communication via the first active bandwidth part associated with the first time slot format to communication via the second active bandwidth part, the communication via the second active bandwidth part being associated with the second time slot format.

2. The apparatus of claim 1, wherein the one or more processors are further configured to execute the processor-executable code to cause the apparatus to:
compare a first identifier of the first active bandwidth part to a second identifier of the second active bandwidth part;
wherein the first active bandwidth part is selected based on the first identifier having a value lower than a value of the second identifier.

3. The apparatus of claim 1, wherein:
the first active bandwidth part is designated as a main active bandwidth part; and
the second active bandwidth part is designated as a secondary active bandwidth part.

4. The apparatus of claim 3, wherein the one or more processors are further configured to execute the processor-executable code to cause the apparatus to:
receive, via the at least one transceiver, first configuration information specifying that the first active bandwidth part is designated as the main active bandwidth part and the second active bandwidth part is designated as the secondary active bandwidth part.

5. The apparatus of claim 1, wherein the one or more processors are further configured to execute the processor-executable code to cause the apparatus to receive, via the at least one transceiver, first configuration information specifying that the apparatus is to at least one of:
monitor physical channels and physical signals in both the first active bandwidth part and the second active bandwidth part;

monitor a physical downlink control channel in the first active bandwidth part and communicate physical downlink shared channel information in both the first active bandwidth part and the second active bandwidth part;
monitor the physical channels and physical signals in the first active bandwidth part until the apparatus is signaled to monitor a different active bandwidth part; or
monitor the physical channels and physical signals in the first active bandwidth part until the apparatus elects to monitor the different active bandwidth part.

6. The apparatus of claim 1, wherein the one or more processors are further configured to execute the processor-executable code to cause the apparatus to:
receive, via the at least one transceiver, an indication that specifies in which one of the first active bandwidth part and the second active bandwidth part the apparatus is to monitor a physical downlink control channel.

7. The apparatus of claim 1, wherein the one or more processors are further configured to execute the processor-executable code to cause the apparatus to:
monitor a physical downlink control channel in the first active bandwidth part based on the first active bandwidth part being designated as a main active bandwidth part.

8. The apparatus of claim 1, wherein the one or more processors are further configured to execute the processor-executable code to cause the apparatus to:
receive, via the at least one transceiver, a downlink control information via a physical downlink control channel in the first active bandwidth part, wherein the downlink control information identifies a physical downlink shared channel in the second active bandwidth part; and
transmit or receive, via the at least one transceiver, information in the physical downlink shared channel in the second active bandwidth part after the downlink control information is received.

9. The apparatus of claim 1, wherein:
the first time slot format is a half-duplex format and the second time slot format is a full-duplex format; or
the first time slot format is a first type of full-duplex format and the second time slot format is a second type of full-duplex format.

10. The apparatus of claim 9, wherein:
the first type of full-duplex format is for a first uplink or downlink band with a first bandwidth that is less than a threshold bandwidth; and
the second type of full-duplex format is for a second uplink or downlink band with a second bandwidth that is greater than the threshold bandwidth.

11. The apparatus of claim 1, wherein the one or more processors are further configured to execute the processor-executable code to cause the apparatus to:
receive, via the at least one transceiver, first configuration information specifying that the first active bandwidth part carries a first type of channel and the second active bandwidth part carries a second type of channel.

12. The apparatus of claim 11, wherein the one or more processors are further configured to execute the processor-executable code to cause the apparatus to:
receive, via the at least one transceiver, scheduling information indicating communication of the first type of channel; and
select the first active bandwidth part for the communication of the first type of channel.

13. The apparatus of claim 11, wherein:

the first type of channel has a higher priority than the second type of channel; or the first active bandwidth part is configured for a first sub-carrier spacing and the second active bandwidth part is configured for a second sub-carrier spacing different from the first sub-carrier spacing.

14. A method for wireless communication by a wireless node, the method comprising:

receiving bandwidth part configuration information from a network entity, the bandwidth part configuration information specifying a first active bandwidth part associated with the wireless node and a second active bandwidth part associated with the wireless node;

selecting the first active bandwidth part;

communicating with the network entity via the first active bandwidth part, the communicating via the first active bandwidth part being associated with a first time slot format; and after a switch from the first time slot format to a second time slot format, switching from the communicating via the first active bandwidth part associated with the first time slot format to communicating via the second active bandwidth part, the communicating via the second active bandwidth part being associated with the second time slot format.

15. The apparatus of claim 1, wherein the apparatus is configured as a user equipment.

16. An apparatus for wireless communication, comprising:

at least one transceiver;

one or more memories that store processor-executable code; and one or more processors configured to execute the processor-executable code to cause the apparatus to:

receive, via the at least one transceiver, bandwidth part configuration information from a network entity, the bandwidth part configuration information specifying a first active bandwidth part associated with the apparatus and a second active bandwidth part associated with the apparatus;

abstain from communication via at least one of the first active bandwidth part or the second active bandwidth part based on the bandwidth part configuration information being a violation of at least one bandwidth part constraint associated with the apparatus; and transmit, via the at least one transceiver, a response to the bandwidth part configuration information, the response indicating that the apparatus will abstain from communication via at least one of the first active bandwidth part or the second active bandwidth part.

17. The apparatus of claim 16, wherein the at least one bandwidth part constraint associated with the apparatus is a bandwidth part bandwidth constraint.

18. The apparatus of claim 17, wherein the bandwidth part bandwidth constraint specifies that a sum of a first bandwidth of the first active bandwidth part and a second bandwidth of the second active bandwidth part is to be less than a threshold bandwidth.

19. The apparatus of claim 16, wherein the at least one bandwidth part constraint associated with the apparatus is a bandwidth part frequency allocation constraint.

20. The apparatus of claim 19, wherein the bandwidth part frequency allocation constraint specifies a minimum guard band between the first active bandwidth part and the second active bandwidth part.

21. The apparatus of claim 16, wherein the at least one bandwidth part constraint associated with the apparatus is at least one channel configuration for a bandwidth part associated with the apparatus.

22. The apparatus of claim 21, wherein the at least one channel configuration for the bandwidth part specifies that a first physical downlink control channel configuration of the second active bandwidth part is a function of a second physical downlink control channel configuration of the first active bandwidth part.

23. The apparatus of claim 16, wherein the at least one bandwidth part constraint associated with the apparatus is a semi-persistent scheduling constraint for a bandwidth part associated with the apparatus.

24. The apparatus of claim 16, wherein the one or more processors are further configured to execute the processor-executable code to cause the apparatus to:

categorize the bandwidth part configuration information specifying the first active bandwidth part for the apparatus and the second active bandwidth part for the apparatus as an error condition.

25. The apparatus of claim 24, wherein the one or more processors are further configured to execute the processor-executable code to cause the apparatus to:

abstain from communication via either of the first active bandwidth part or the second active bandwidth part.

26. The apparatus of claim 16, wherein the one or more processors are further configured to execute the processor-executable code to cause the apparatus to:

communicate via the at least one transceiver and via the first active bandwidth part; and abstain from communication via the second active bandwidth part.

27. The apparatus of claim 26, wherein the one or more processors are further configured to execute the processor-executable code to cause the apparatus to:

compare a first identifier of the first active bandwidth part to a second identifier of the first active bandwidth part; and select the first active bandwidth part for communication based on the first identifier having a value lower than a value of the second identifier.

28. The apparatus of claim 16, wherein the bandwidth part configuration information comprises a common bandwidth part configuration for a plurality of user equipments.

29. The apparatus of claim 16, wherein the one or more processors are further configured to execute the processor-executable code to cause the apparatus to:

receive, via the at least one transceiver, the bandwidth part configuration information via a radio resource control message.

30. A method for wireless communication by a wireless node, the method comprising:

receiving bandwidth part configuration information from a network entity, the bandwidth part configuration information specifying a first active bandwidth part associated with the wireless node and a second active bandwidth part associated with the wireless node;

abstaining from communicating via at least one of the first active bandwidth part or the second active bandwidth part based on the bandwidth part configuration information being a violation of at least one bandwidth part constraint associated with the wireless node; and transmitting a response to the bandwidth part configuration information, the response indicating that the wireless node will abstain from communicating via at least one of the first active bandwidth part or the second active bandwidth part.

31. The apparatus of claim 16 wherein the apparatus is configured as a user equipment.

\* \* \* \* \*